United States Patent [19]

Kasagami et al.

[11] Patent Number: 5,243,266
[45] Date of Patent: Sep. 7, 1993

[54] TEACHING CONTROL DEVICE FOR MANUAL OPERATION IN AN INDUSTRIAL ROBOTS-SYSTEM

[75] Inventors: Fumio Kasagami, Nara; Seisuke Kugumiya, Oita, both of Japan

[73] Assignee: Kabushiki Kaisha Daihen, Osaka, Japan

[21] Appl. No.: 908,196

[22] Filed: Jul. 2, 1992

[30] Foreign Application Priority Data

Jul. 5, 1991 [JP] Japan ................... 3-192493

[51] Int. Cl.⁵ ............................................. B25J 9/00
[52] U.S. Cl. ............................ 318/568.1; 318/568.19; 318/568.13; 395/97; 364/191; 901/3; 901/8
[58] Field of Search ........................... 318/560–578; 395/80–99; 901/3, 5, 7, 9, 12, 13, 15, 19, 20, 21, 44, 45, 46, 47, 42; 364/191

[56] References Cited

U.S. PATENT DOCUMENTS

| | | | |
|---|---|---|---|
| 4,712,183 | 12/1987 | Shiroshita et al. | 395/97 |
| 4,853,771 | 8/1989 | Witriol et al. | 901/9 X |
| 4,954,762 | 9/1990 | Miyake et al. | 318/508.19 |
| 4,983,797 | 1/1991 | McAllister et al. | 901/42 X |
| 5,020,001 | 5/1991 | Yamamoto et al. | 901/3 X |
| 5,086,401 | 2/1992 | Glassman et al. | 395/93 X |
| 5,148,591 | 9/1992 | Pryor | 29/407 |

FOREIGN PATENT DOCUMENTS

61-42004 2/1986 Japan.
62-114009 5/1987 Japan.

*Primary Examiner*—Paul Ip
*Attorney, Agent, or Firm*—Lowe, Price, LeBlanc & Becker

[57] ABSTRACT

An industrial robotic system related to the present invention provides a workpiece handling robot manipulating a workpiece and a tool handling robot manipulating a tool processing the workpiece. A teaching control device for manual operation of the robotic system controls not only the execution of a conventional sole-acting manual mode of operation, but also the execution of a co-acting manual mode of operation. According to a co-acting manual mode of operation, "a relative position and a relative attitude of a tool against a workpiece" are maintained substantially constant.

When the manipulation of the workpiece is executed in order to get a new setting state by means of a co-acting manual mode of operation from an initial setting state, the tip point of the tool is remained at an aimed point on the workpiece and an attitude of the tool against the workpiece is maintained without interference between the tool and the workpiece.

The new setting state for teaching a new teaching point is established by means of sole-acting manipulating the tool from the aimed point manipulated by the workpiece handling robot to a new aimed on the workpiece.

3 Claims, 24 Drawing Sheets

TEACHING CONTROL DEVICE FOR MANUAL OPERATION IN AN INDUSTRIAL ROBOTS-SYSTEM

TECHNICAL FIELD OF THE INVENTION

The present invention relates to a teaching control device for manual operation in an industrial-robots, and more particularly, to an industrial robot-equipment capable of being taught by manual teaching operation and having a workpiece handling robot that is capable of changing the "position and attitude" of the workpiece held in an end effector, such as a robot hand etc., and a tool handling robot that is capable of changing the "position and attitude" of the tool processing of the workpiece.

BACKGROUND OF THE PRIOR ART

The industrial-robots having a workpiece handling robot and a tool handling robot provided with a tool, such as a machining tool, a welding torch or a welding gun etc., are generally controlled by a method of teaching playback so as to move both robots at the same time in real processing operations.

The teaching operations for the robots have to be performed before real processing operations. Both robots are subjected to sole-acting manual operation.

Referring to FIG. 24(a) of the prior art, the desired positioning for each robot are first independently achieved by means of separate movement of workpiece 1m on the workpiece handling robot 1 from the movement of tool 2n on the tool handling robot 2. The point A in the "position and attitude", which are established by the above-mentioned independent movement, is taught as a teaching point of the first position. This means that the data of "position and attitude" of tool 2n against workpiece 1m at the point A and the data of "joint variables" of workpiece handling robot 1 are memorized in a computer.

Thereafter, tool 2n and workpiece 1m have to be moved according to commands of an operator in order to obtain the second position. When the workpiece 1m is moved by means of movement of workpiece handling robot only as shown by a broken line, after the teaching point A of the first position, the workpiece 1m often contacts or collides with the tool 2n. Therefore, it is necessary to avoid the interference of workpiece 1m and tool 2n with each other.

An operator needs to command tool 2n to retire from workpiece 1m as shown in FIG. 24(b), after teaching point A at the first position.

Next, the workpiece 1m is moved in the direction of an arrow 1p by moving the workpiece handling robot 1 as shown in FIG. 24(c) in order to obtain a desired position for a next teaching point B. As shown in FIG. 24(d), the point B is taught at the second position which is established by returning tool 2n to workpiece 1m through the movement of tool handling robot 2.

It is very inconvenient to retire the tool from the workpiece in the middle of teaching operations. Many teaching points forces an increase of in the number of times for retiring the tool from the workpiece. Because it takes a lot of time to retire the tool and to return the tool the teaching time is, on the whole, prolonged.

Furthermore, an operator often loses sight of the desired next teaching point on the workpiece when the distance between a teaching point and a next one is short or when an arrangement of a series of teaching points is complicated.

The first objects of this invention is to enable a tool on tool handling robot the movement of workpiece on workpiece handling robot by means of co-acting with each other when an operator teaches both of robots by the manual operations.

The second object is to exactly realize and maintain previous position and attitude of the tool against the workpiece without retiring the tool from the workpiece one by one during the teaching operations.

The third object is to present a teaching control device for simplified manual teaching operations in an industrial robots-system where teaching operations can be rapidly performed by means of accurately subjecting the tool to movement of the workpiece.

SUMMARY OF THE INVENTION

The present invention is relates to an industrial robots-system taught by means of manual teaching operations, which is provided with a workpiece handling robot that is capable to change "position and attitude" of a workpiece and a tool handling robot that is capable to change "position and attitude" of a tool for processing said workpiece, and composing;

a selecting means for sole-action/co-action enables to select sole-acting manual operation that facilitates changing position and attitude of workpiece on workpiece handling robot and changing position and attitude of tool on tool handling robot separately, or to select co-acting manual operation that facilitates changing position and attitude of tool on tool handling robot by means of co-acting with changing position and attitude of workpiece on workpiece handling robot so that position and attitude of the tool against workpiece can be always kept constant.

a teaching key means outputs actuating signals for changing position and attitude of workpiece.

a control means for manual teaching operations carries out control according to process mentioned after by means of receiving actuating signals from said teaching key means and a co-acting signal from said selecting means for sole-action/co-action, and said control means for manual teaching operations is a computer carries out controlling function, including;

the first process consists of picking up actuating signals, and computing position and attitude of workpiece handling robot at the starting time of manual teaching operations and position and attitude of tool against workpiece at the starting time of manual teaching operations.

the second process consists of commanding to carry out the third process by means of estimating the state after a preset infinitesimal time when actuating signals in the first process are maintained, and commanding to return to the first process when actuating signals have already changed into different ones, and commanding to terminate teaching operations when all of actuating signals have already vanished.

the third process consists of not only calculating position and attitude of workpiece handling robot but previously calculating position and attitude of tool handling robot by use of position and attitude of tool against workpiece at the starting time of manual teaching operations, which were calculated at the first process, and position and attitude of workpiece handling robot at the starting time of manual teaching operations, which were calculated at the first process, the fourth process consists of not only calculating joint variables of workpiece handling robot by use of position and attitude of workpiece handling robot which were calculated at the third process but calculating joint variables of tool handling robot by use of position and attitude of tool handling robot which were calculated at the third process, the fifth process consists of not only previously calculating actuating values for actuators of workpiece handling robot by use of joint variables of workpiece handling robot which were calculated at the fourth process but to previously calculating actuating values for actuators of tool handling robot by use of joint variables of tool handling robot which were calculated at the fourth process, in addition, including not only to synchronously output signals of actuating values for actuators of workpiece handling robot and signals of actuating values for actuators of tool handling robot just after an infinitesimal time, but to command repeating on and after the second process.

Said actuating signals of the teaching key means may be adopted the signals commanding translation along each axis or rotation around each axis in the cartesian coordinates of position and attitude of workpiece handling robot. And said actuating signals of the teaching key means may be also adopted the signals commanding motions of joints of workpiece handling robot.

According to the present invention, even if position and attitude of workpiece is changed in order to teach a next teaching point from one teaching point, the movement of tool handling robot can be acculately subjected to that of workpiece handling robot by means of co-acting each other so that position and attitude of tool against workpiece at the starting time of manual teaching operations can be always kept constant. As a result, it becomes unnecessary to retire the tool from the workpiece in order to avoid interference each other, when the workpiece is moved to desired positions. An operator is able to catch the last teaching point even when a next point is taught in the state that position and attitude of workpiece have already been changed, therefore, enabling rapid and exact teaching of other next points.

DETAILED DESCRIPTION OF THE INVENTION

A teaching control device for manual operation in an industrial robots-system of the present invention is disclosed by an application to a welding robots-system having a workpiece handling robot and a tool handling robot.

Figure 1:
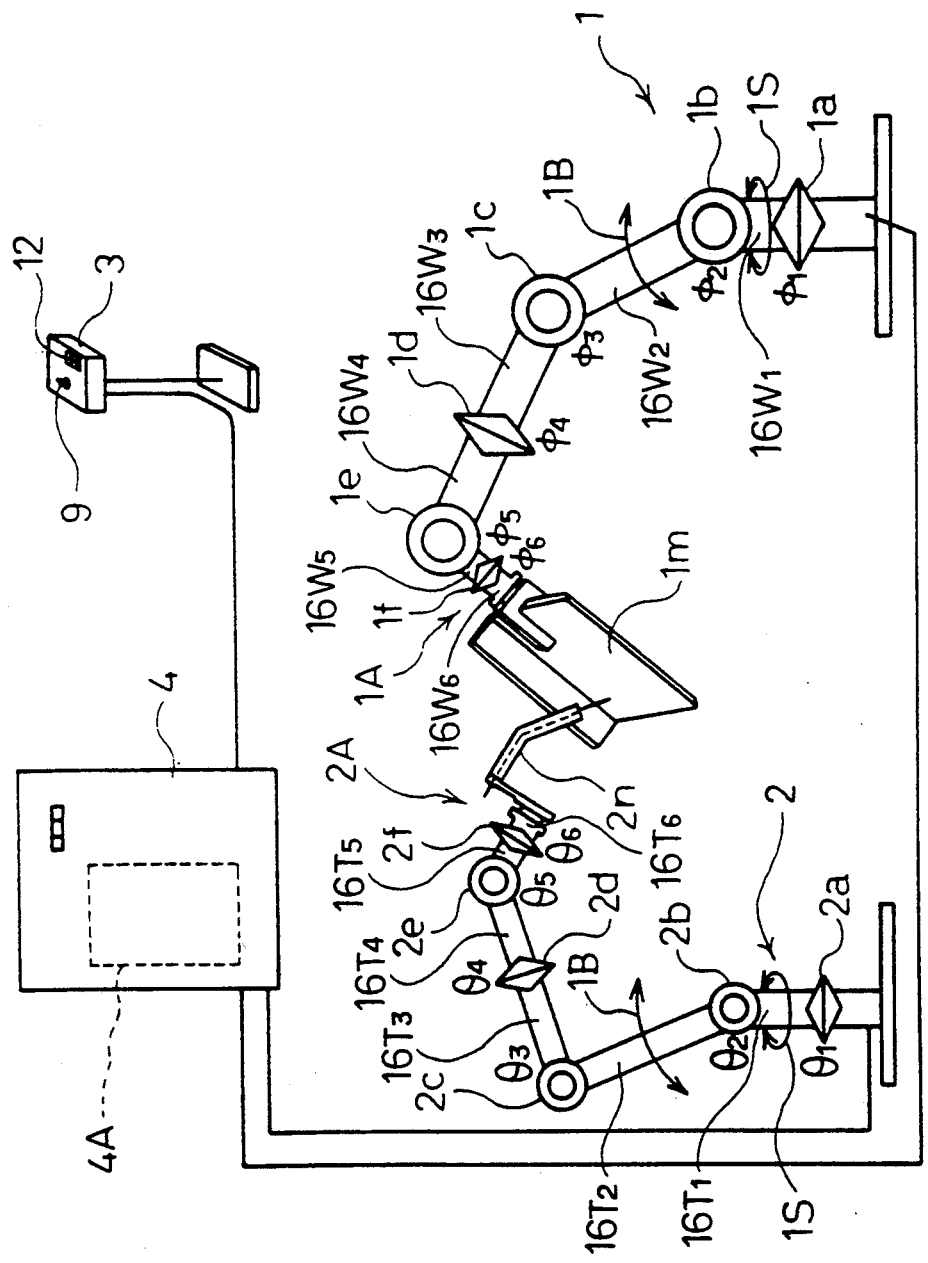
FIG. 1 is a schematic drawing of a teaching control device and a teach pendant in an industrial robots-system comprising a workpiece handling robot and a tool handling robot.
Figure 2:
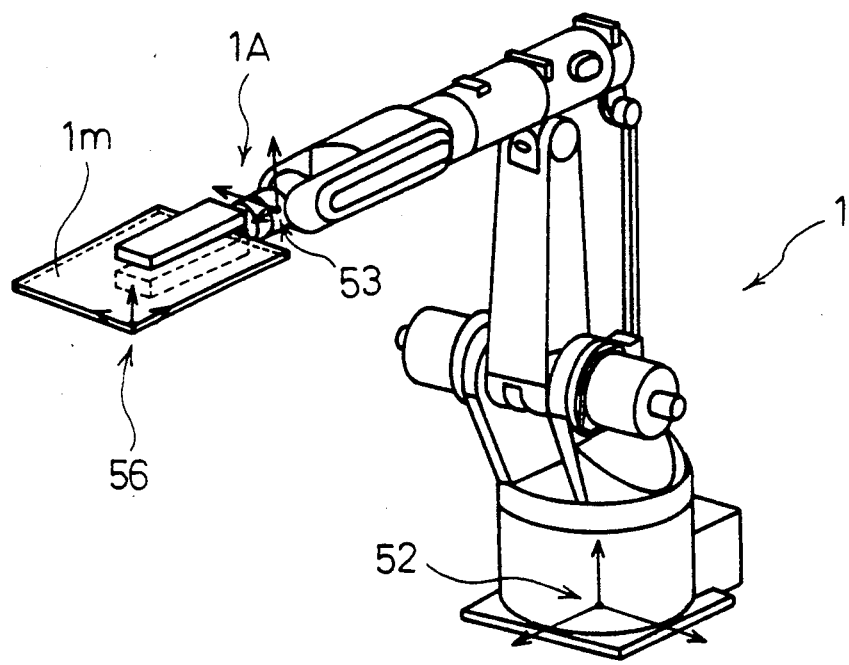
FIG. 2 is a schematic drawing of a workpiece handling robot with 6 degrees of freedom and holding a workpiece in an end effector.
Figure 3:
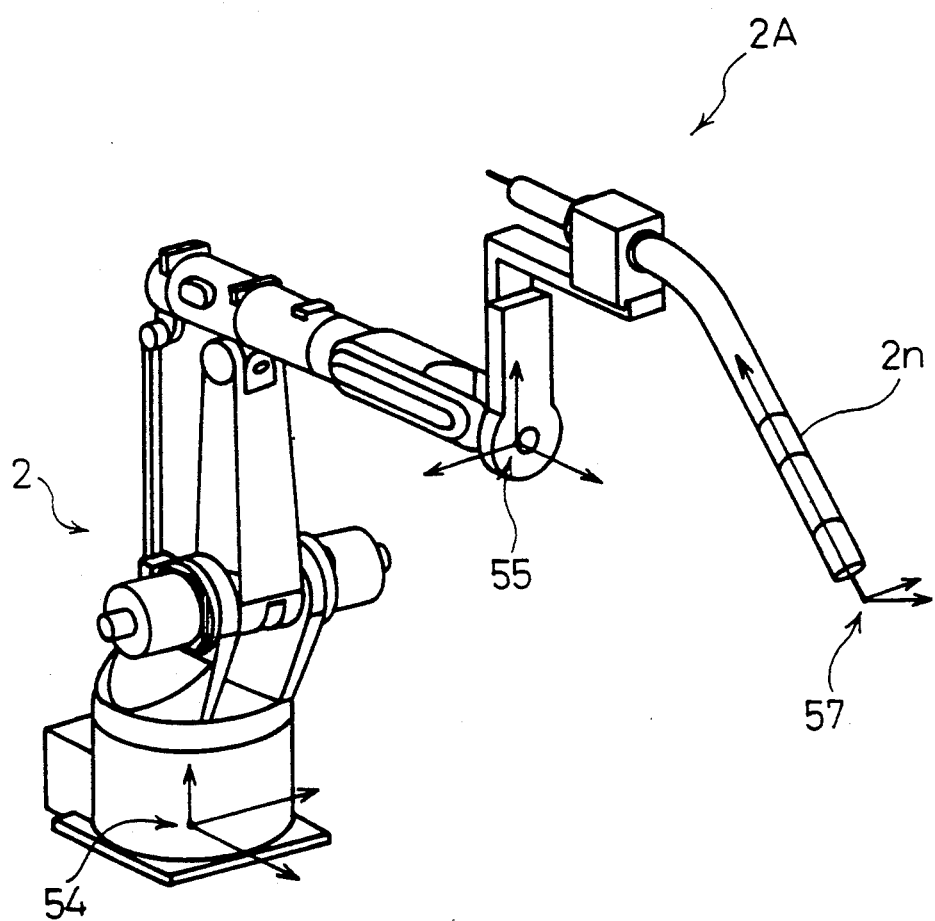
FIG. 3 is a schematic drawing of a tool handling robot of 6 degrees of freedom which installs a tool in an end effector.

This robotic system is provided with a workpiece handling robot 1 which is capable of changing the "position and attitude" of a workpiece 1m as shown in FIG. 2 and a tool handling robot 2 which is capable of changing the "position and attitude" of a tool 2n for processing the workpiece as shown in FIG. 3. Both the workpiece handling robot 1 and tool handling robot 2 are disposed to face each other as shown in FIG. 1, and the position and attitude of workpiece 1m and position the and attitude of tool 2n required in real processing operations, e.g., during the welding operations, can be manually taught before the real processing operations.

The workpiece handling robot 1 which moves a workpiece 1m held in an end effector 1A, such as a robot hand, is a manipulator of 6 degrees of freedom which has "joint variables" $\phi_1$ to $\phi_6$ corresponding to, for example, 6 joints 1a to 1f, respectively. Similarly, the tool handling robot 2 which moves a tool 2n installed in an end effector 2A is also a manipulator of 6 degrees of freedom which has "joint variables" $\theta_1$ to $\theta_6$ corresponding to 6 joints 2a to 2f, respectively. Each of the joints 1a, 2a etc., indicated by diamond marks, means a swivel-joint which rotates each of the links 16$W_1$, 16$T_1$ in the direction of an arrow 1S, and each of joints 1b, 2b etc., indicated by double-circles, means a bend-joint which bends each of the links 16$W_2$, 16$T_2$ in the direction of an arrow 1B. When some of the joints are actuated at the same time, the workpiece and the tool can be moved to desired directions respectively, i.e., being moved to the direction of, for instance, X-axis only and being rotated around Y-axis only.

Figure 4:
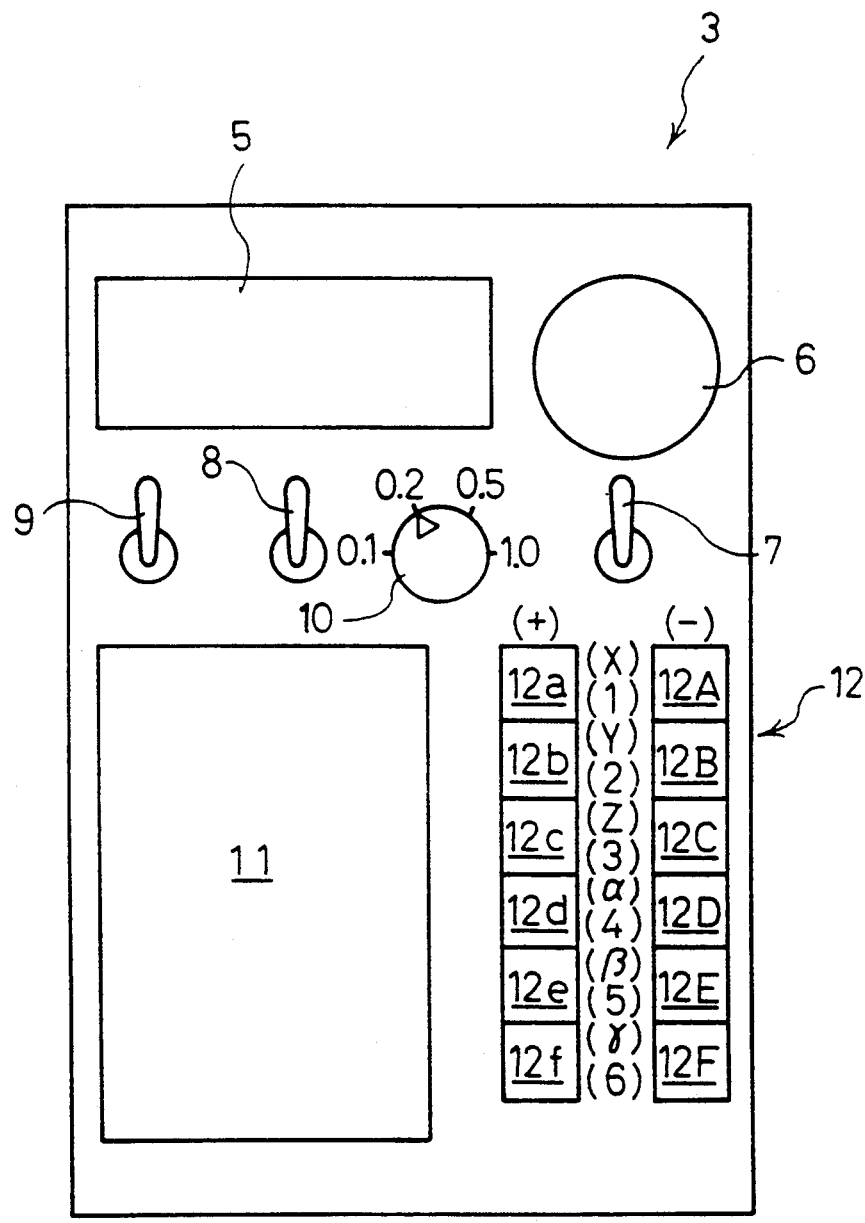
FIG. 4 is a schematic drawing of an operation panel of a teach pendant provided with some kind of changing switches.

A teach pendant 3 and a control equipment 4 are provided in order to operate the workpiece handling robot 1 and tool handling robot 2. FIG. 4 shows an operation panel of the teach pendant 3, on which an indicating device 5 and a stopping switch 6 are disposed. There is a robot changing switch 7 on the right hand side of the middle stage of the operation panel for selecting a robot which should be subjected to the teaching operations, e.g., tiling it up means preparation for the movement of the workpiece handling robot 1 and tilting it down means preparation for the movement of the tool handling robot 2.

In the center of the operation panel of the teach pendant is provided a mode changing switch 8 in order to select "mode of each axis manual operation" or "mode of cartesian coordinates manual operation". An operation changing switch 9 is prepared on the left end of the operation panel, which is changed to select "sole-action" of each robot at the teach operation or "co-action" of both robots at the teach operation. This switch organizes "a selecting means for sole-action/co-action", which facilitates the "manual operations of changing the position and attitude of the workpiece 1m on workpiece handling robot 1" and the "manual operations of changing the position and attitude of tool the 2n on tool the handling robot 2" separately, or facilitates "the manual operation of the change position and attitude of the tool 2n on a tool handling robot 2" by means of associating with changing the position and attitude of the workpiece 1m on a workpiece handling robot 1 so that position the and attitude of the tool 2n against workpiece 1m can be always kept constant.

Therefore, the above-mentioned "co-action" of both robots at the teaching operations means "the manual operation of changing position the and attitude of the tool 2n on a tool handling robot 2 so that the position and attitude of the tool 2n against workpiece 1m are never changed while the position and attitude of the workpiece 1m on a workpiece handling robot 1 are being changed" or "the manual operation of changing the position and attitude of the workpiece 1m on a workpiece handling robot 1 so that the position and attitude of the workpiece 1m against the tool 2n are never changed while the position and attitude of the tool 2n on a tool handling robot 2 are being changed". But the former only is applied to an embodiment in the following description.

The portion of a scale in the center of the panel is a rate changing switch 10 which is used in order to select a desired rate for the movement of a workpiece 1m during the teach operations so as to move it more slowly than a preset maximum value of a velocity table.

When a scale of, for example, 0.5 is selected, the workpiece 1m can be moved at a half speed to the position which is taught by an operator. If the workpiece is required to move quickly, the scale of 1.0 is selected by an operator. Any rate may be selected during the teaching operations. When the path from a present teaching point to a next one is rather long, the rate of, e.g., 1.0, is used until 80% of the path and the rate of 0.1 is used during 20% left thereof. As a result, workpiece 1m is quickly moved to the vicinity of the target, and it is slowly moved close to the target, and it is accurately stopped at the target in a short time. Overshooting the target owing to selecting a higher rate, an operator has only to command to return to the target. It is convenient for a lower rate to relieve the tension of a teaching operator who tries to just stop the workpiece at the next teaching position. Therefore, the rates of this embodiment are provided with 4 of, e.g., 0.1, 0.2, 0.5, 1.0.

In the lower stage at the left hand side of the panel is provided an editing device 11 for the teaching data. A group of keys 12 is disposed at the right hand side of the editing device. Each of the keys 12a~12f, 12A~12F generates an output signal of "1", when it is pressed, and generates a signal of "0" when released. This group of keys 12 which consists of 12, push-buttons organizes a teaching key means to generate the "actuating signals" for the teaching operations.

Such a group of keys 12 is explained as follows; In the state that the mode changing switch 8 has been selected to "mode of each axis manual operation", when the keys 12a~12f at the left column are pressed, each of the joints of the workpiece handling robot 1 rotates, respectively, and when the keys 12A~12F at the right column pressed, each of them reversely rotates, respectively.

Figure 5:
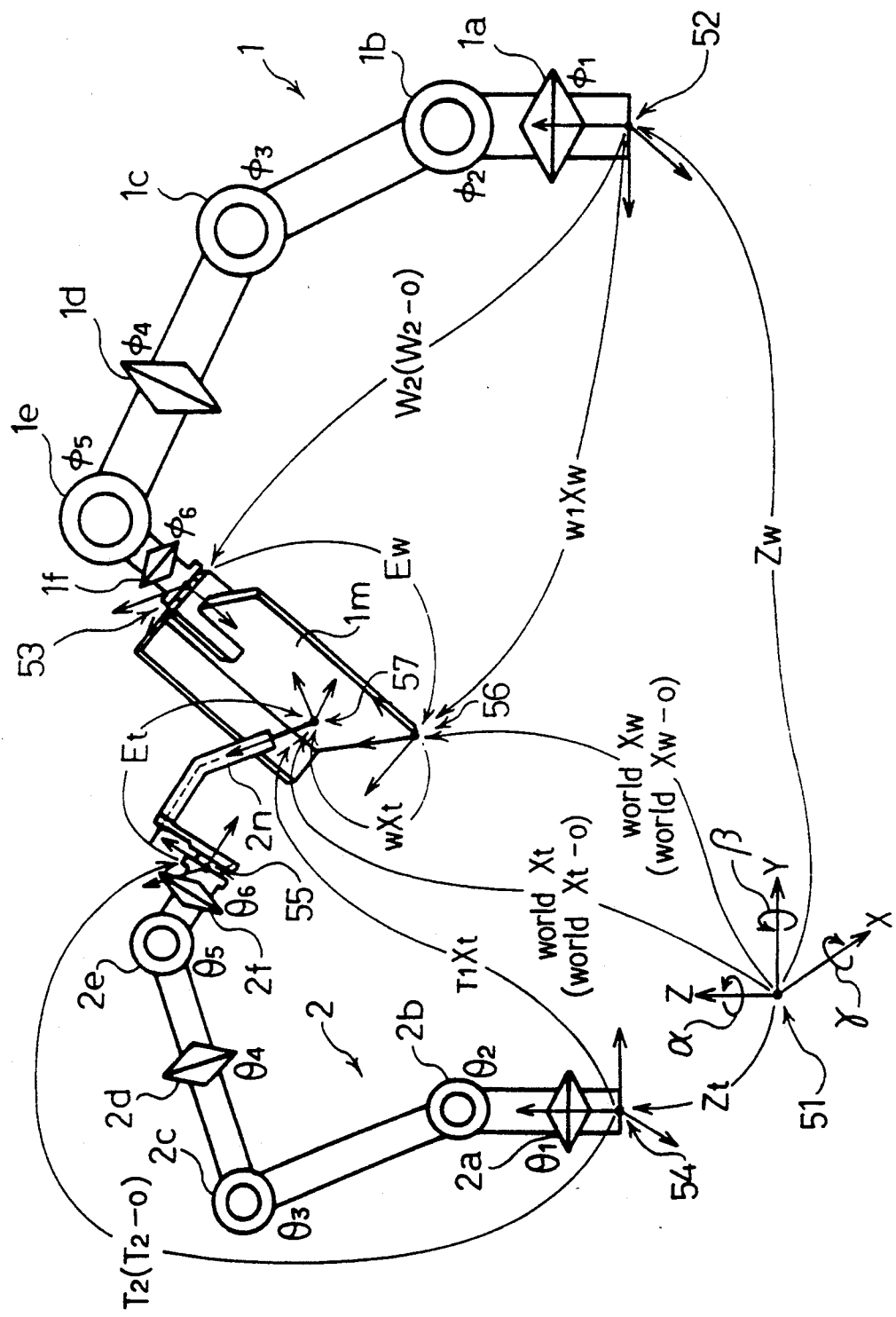
FIG. 5 is a schematic drawing for explanations of homogeneous transformation matrixes which show relations of the position and attitude between each coordinate for the workpiece handling robot and each coordinate for the tool handling robot.

On the other hand, in the state that the mode changing switch 8 has been selected to the "mode of cartesian coordinates manual operation", when the keys of the upper three are pressed, movements to the directions of X-axis, Y-axis, Z-axis of the world coordinates system 51, respectively, as shown in FIG. 5 are performed, i.e., pressing the left keys 12a~12c realizes the movement to the positive directions of each axis, and pressing the right ones 12A~12C realizes the movement to the negative directions thereof. When the keys of the lower three are pressed, rotations to the directions of Euler's angles $\alpha$, $\beta$, $\gamma$ of the world coordinates system 51 respectively as shown in FIG. 5 are performed, i.e., pressing the left keys 12d~12f realizes rotation to the positive directions, and pressing the right ones 12D~12F realizes reverse rotation.

Such a teaching control device for the manual operation in an industrial robots-system consists of a control equipment 4 which is provided with a computer 4A as a "control means for manual teaching operation", which carries out a control by means of receiving commands of "actuating signals" from the group of keys 12 and commands of "co-acting signal" from the operation changing switch 9 as shown in FIG. 1. This "control means for manual teaching operations" 4A provides, as shown in FIG. 6, a micro-processing unit 14 which consists of CPU, ROM and RAM etc. and surbo-drivers 15 which transform output signals of the micro-processing unit into the actuating signals for the actuators explained as follows.

As the workpiece handling robot 1 and tool handling robot 2 with manipulators of 6 degrees of freedom are driven by respectively, the surbo-drivers 15 consisting of 12 surbo-drivers $15W_1 \sim 15W_6$ and $15T_1 \sim 15T_6$ and actuators 17 as electric motors consisting of actuators $17W_1 \sim 17W_6$ and $17T_1 \sim 17T_6$ corresponding to each of surbo-drivers 15 so that they can rotate the links $16W_1 \sim 16W_6$ and $16T_1 \sim 16T_6$ connected with the joints of robots 1 and 2.

Figure 6:
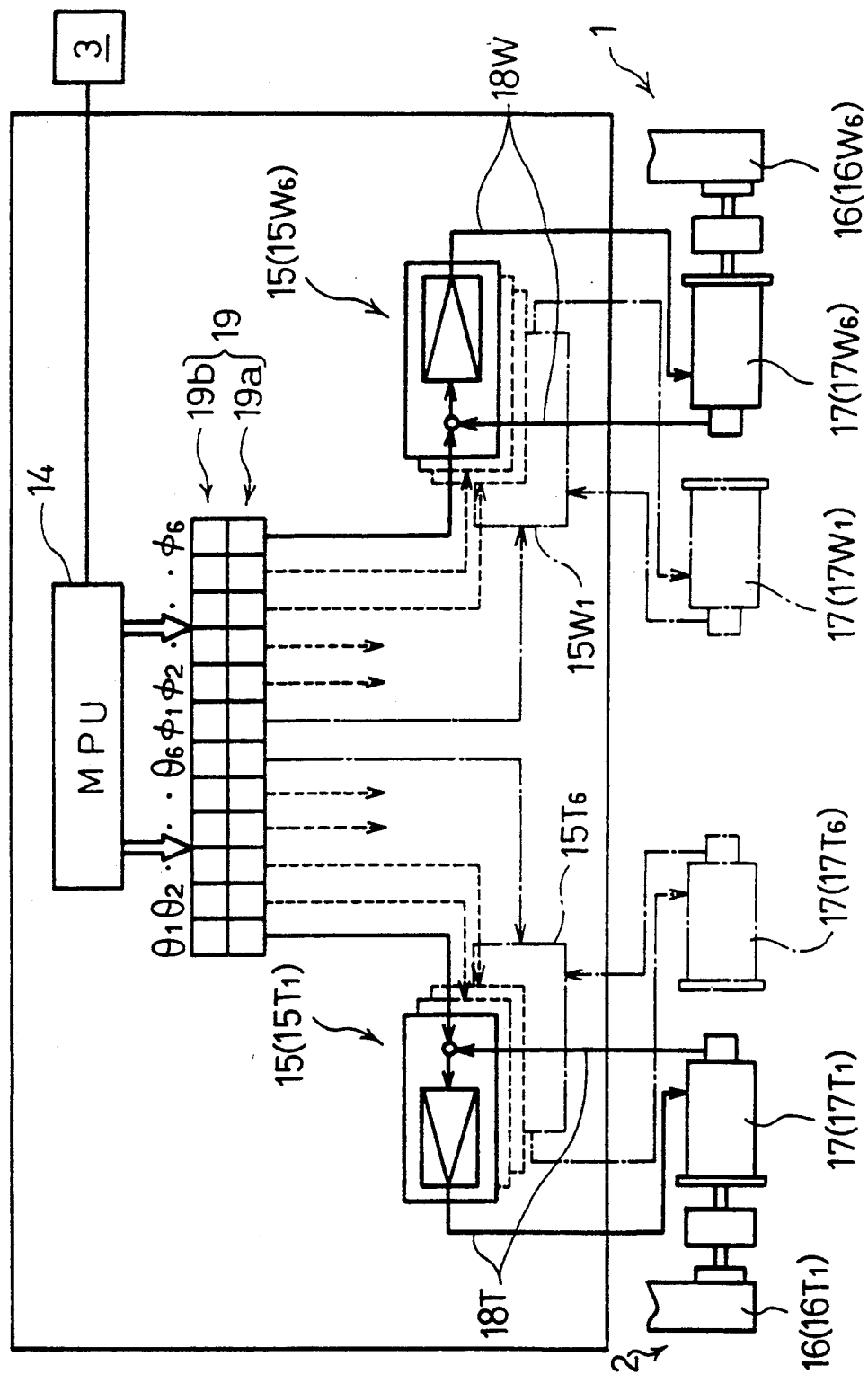
FIG. 6 is a block diagram of a control means for the manual teaching operations which relates to the actuators of each robot.

The symbol 18W in FIG. 6 is a control cable which connects each of surbo-drivers 15W with the corresponding actuator 17W of workpiece handling robot 1, and the symbol 18T is also a control cable which connects each of surbo-drivers 15T with the corresponding actuator 17T of tool handling robot 2. The numeral 19 is an interface which transmits signals of the "actuating value for each actuator", i.e., the symbol 19a indicates an interface for outputting, and 19b indicates a buffer. They have 12 windows corresponding to "joint variables" $\phi_1, \phi_2, \ldots, \phi_6$ of workpiece handling robot 1 and corresponding to "joint variables" $\theta_1, \theta_2, \ldots, \theta_6$ of tool handling robot 2, respectively.

This "control means for the manual teaching operations" 4A includes a control program which carries out five processes described as follows;

The first process is to calculate the actuating velocities of workpiece handling robot 1 under the rate "r" selected on the rate changing switch 10 when the commands of the "actuating signals" from group of keys 12 and the commands of a "co-acting signal" from the operation changing switch 9 have been received. And this process includes calculating the position and attitude of workpiece handling robot 1 at the starting time of the manual teaching operations, and calculating position and attitude of tool 2n against workpiece 1m at the starting time of the manual teaching operations.

The second process is a command carrying out the following third process by means of estimating the state after a preset infinitesimal time $\Delta T$, e.g., one-twentieth of a second when the "actuating signals" in the first process are maintained. Or this process is a command to return to the first process when the "actuating signals" have already changed into different ones. Or this process is a command to terminate the teaching operations when all of the "actuating signals" have already vanished.

The third process is not only to calculate the position and attitude of workpiece handling robot 1 but to calculate the previous the position and attitude of tool handling robot 2 by use of position and attitude of tool 2n against workpiece 1m at the starting time of the manual teaching operations, which were calculated at the first process, and by use of the position and attitude of workpiece handling robot 1 at the starting time of the manual teaching operations, which were calculated at the first process.

The fourth process is not only to calculate the "joint variables" of workpiece handling robot 1 by use of the position and attitude of workpiece handling robot 1 which were calculated at the third process but to calculate the "joint variables" of tool handling robot 2 by use of the position and attitude of tool handling robot 2 which were calculated at the third process.

The fifth process is not only to calculate the previous "actuating values for actuators" $a_{w1-i}, a_{w2-i}, \ldots, a_{w6-i}$ of workpiece handling robot 1 by use of the "joint variables" of workpiece handling robot 1 which were calculated at the fourth process but to calculate the previous "actuating values for actuators" $a_{t1-i}, a_{t2-i}, \ldots, a_{t6-i}$ of tool handling robot 2 by use of the "joint variables" of tool handling robot 2. And this process includes not only to synchronously output the signals of the "actuating values for actuators" $a_{w2-i}, a_{w2-i}, \ldots, a_{w6-i}$ of workpiece handling robot 1 and the signals of "actuating values for actuators" $a_{t1-i}, a_{t2-i}, \ldots, a_{t6-i}$ of tool handling robot 2 just after an infinitesimal time $\Delta T$, e.g., one-twentieth of a second, but a command to repeat on and after the second process.

The "control means for the manual teaching operations" 4A provides a program for carrying out the above-mentioned "co-action" which associates the change of the position and attitude of workpiece 1m on workpiece handling robot 1 with the change of the position and attitude of tool 2n on tool handling robot 2. In addition to this program, the control means 4A also provides a program carrying out the "sole-action" which acts either on workpiece handling robot 1 or tool handling robot 2 according to the robot changing switch 7 when "sole-action" which does not associate the change of the position and attitude of workpiece 1m on workpiece handling robot 1 with the change of the position and attitude of tool 2n on tool handling robot 2 is selected by the operation changing switch 9.

Referring to some of the flow charts in and after FIG. 7, the manual teaching operations of workpiece handling robot 1 and tool handling robot 2 in the above-mentioned system related to the present invention are described as follows;

[1] The "co-acting cartesian coordinates manual operation" is explained below, which is in a state that the "mode of cartesian coordinates manual operation" is selected by the mode changing switch 8 and the "co-action" is selected by the operation changing switch 9. This means the referential point 56 of workpiece 1m with respect to the world coordinates system 51, as shown in FIG. 5, is changed into the desired position and attitude thereof without changing the relative position and attitude between tool 2n and workpiece 1m.

An operator chooses the "co-action" in the operation changing switch 9, the "mode of cartesian coordinates manual operation" in the mode changing switch 8 and the "workpiece handling robot" in the robot changing switch 7 on the teach pendant 3. Moreover, a desired rate "r", e.g., 0.2, which is indicated as "$r_b$", is chosen in the rate changing switch 10.

An operator presses the desired keys, e.g., 12b, 12c and 12E. The procedure is as follows;

[a]: The first process consists of the after-mentioned [a-1] to [a-4].

Figure 7:
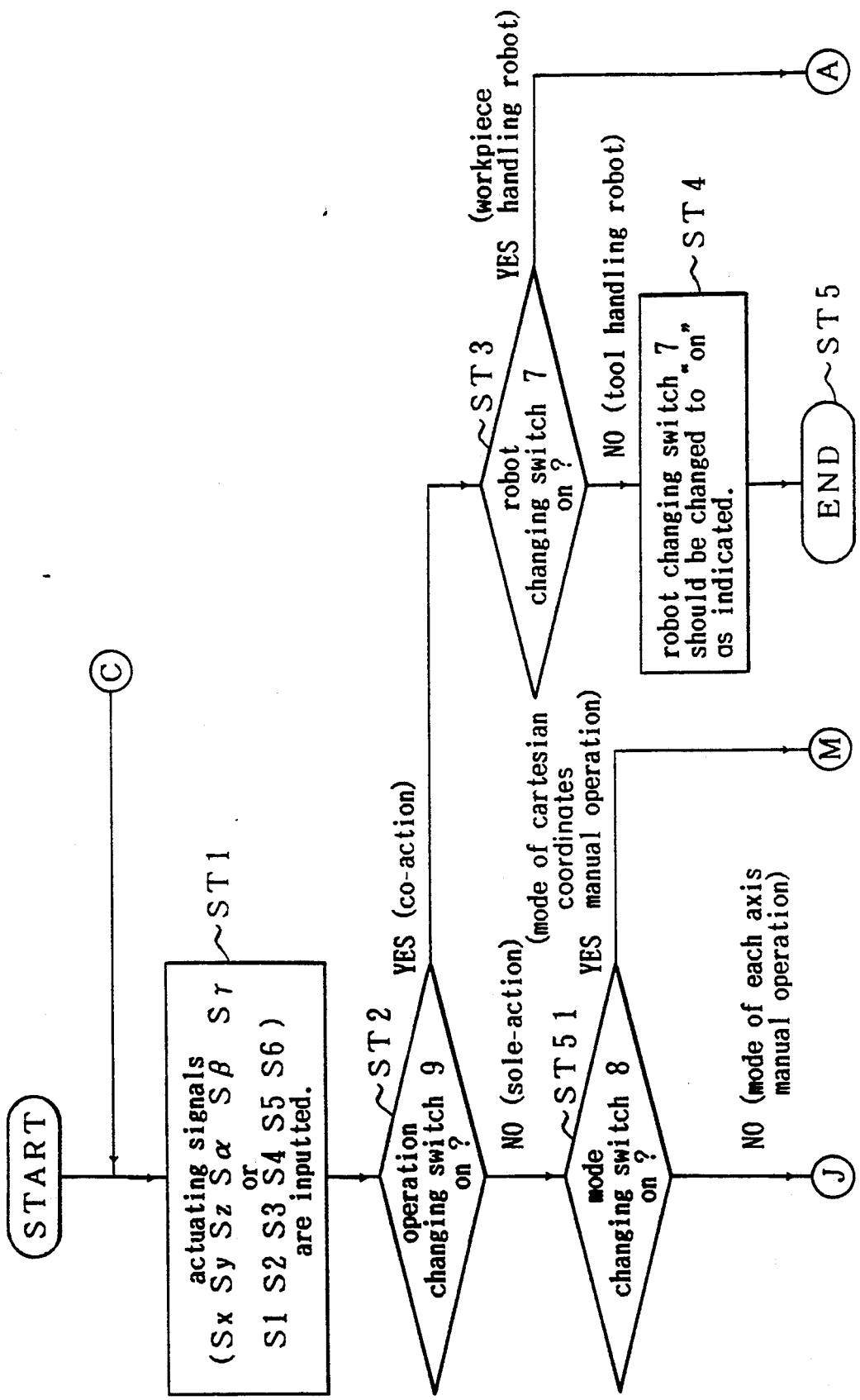
FIG. 7 is a flow chart which the explains controlling at the initial phase.
Figure 8:
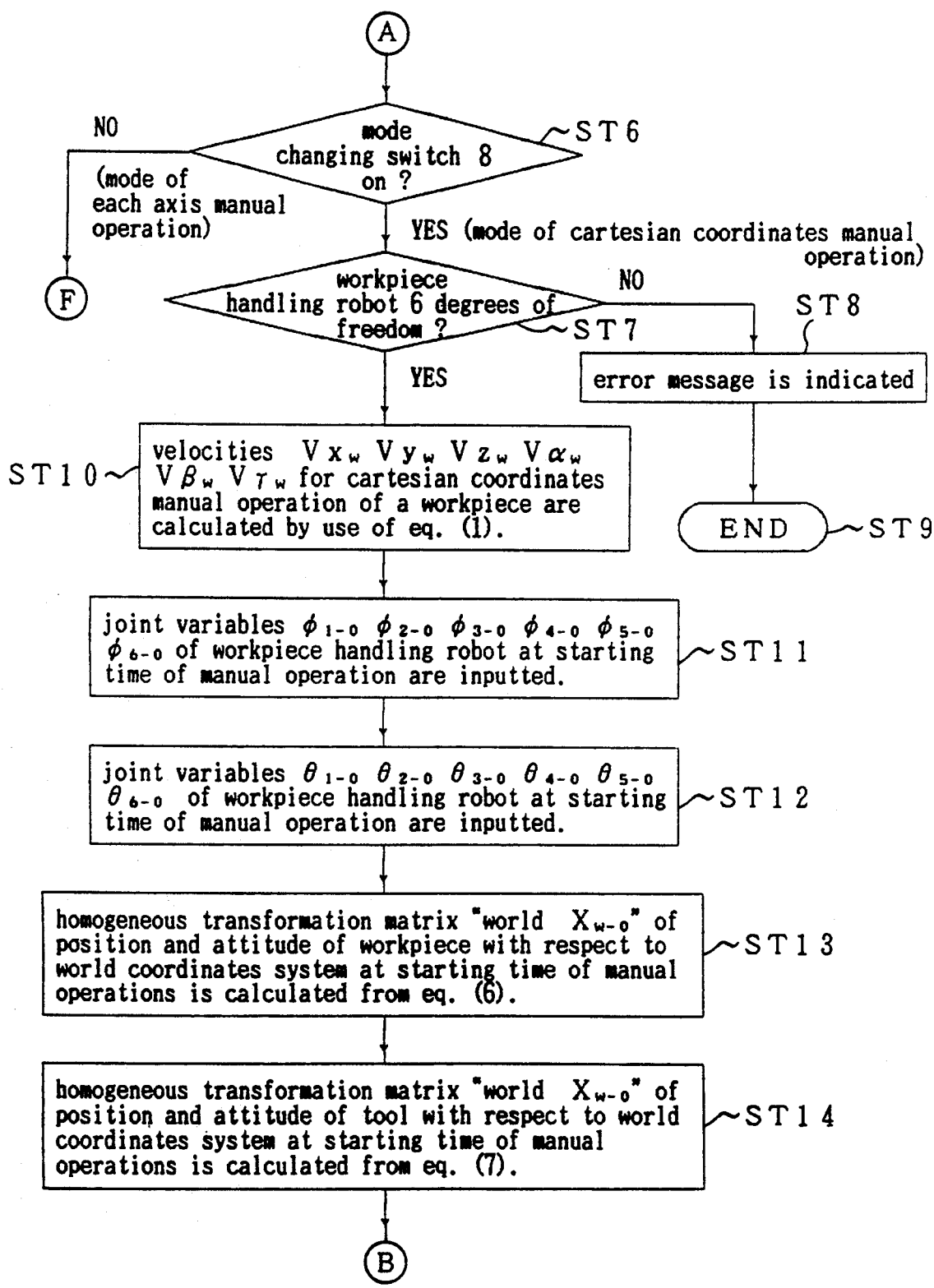
FIG. 8 is a flow chart which explains the motion of "co-acting".

The actuating signals are inputted to the control equipment by means of pressing the keys 12b, 12c and 12E [see step 1 in the flow chart of FIG. 7, which is indicated as ST1]. As the operation changing switch 9 is "on", i.e., being selected "co-action" [ST2], the robot changing switch 7 is "on", i.e., being designated the "workpiece handling robot" [ST3] and the mode changing switch 8 is "on", i.e., selects the "mode of cartesian coordinates manual operation" [ST6 in FIG. 8], the procedure is led to step 7. If the robot changing switch 7 is "off", i.e., being designated "tool handling robot" [ST3], the procedure for controlling the later becomes impossible. In this case, it is indicated on the indicating device that the robot changing switch 7 should be "on", i.e., a message of designating the "workpiece handling robot" appears in an undrawn CRT etc. [ST4], and the procedure is terminated at this time [ST5].

A workpiece handling robot 1 with a manipulator of 6 degrees of freedom or a positioner of less than 3 degrees of freedom may be used. A manipulator of 6 degrees of freedom only is, however, applied to the control in this embodiment of the present invention, therefore, in step 7, it is discriminated whether workpiece handling robot 1 is a manipulator of 6 degrees of freedom or not.

As the degree of freedom of workpiece handling robot 1 was previously stored in the "control means for manual teaching operations" 4A, the discrimination of whether workpiece handling robot 1 is a 6 degrees of freedom is carried out by means of the stored signal. If workpiece handling robot 1 is a positioner, a message that the procedure for controlling later is impossible is indicated in an undrawn CRT etc. [ST8], and the procedure is terminated at that time [ST9].

The program includes a protective program to prevent a reckless operation of the computer, so that "cartesian coordinates manual operation" may become impossible unless workpiece handling robot 1 is 6 degrees of freedom type. As a positioner is generally less than 3 degrees of freedom, "cartesian coordinates manual operation" can not be carried out, but the positioner is able to carried out by the means of "mode of each axis manual operation" mentioned later. If the workpiece handling robot 1 is a 6 degrees of type freedom [ST7], the procedure is led to step 10.

[a-1]; Velocities for the translation and rotation of the referential point 56 of workpiece 1m in the absolute coordinates system 51 are calculated as follows;

The velocities $Vx_w$, $Vy_w$, $Vz_w$, $V\alpha_w$, $V\beta_w$, $V\gamma_w$ are computed by use of actuating signals $Sx$, $Sy$, $Sz$, $S\alpha$, $S\beta$, $S\gamma$ generated by keys 12b, 12c and 12E, a designated rate "$r_b$" and maximum values $Vx_{w0}$, $Vy_{w0}$, $Vz_{w0}$, $V\alpha_{w0}$, $V\beta_{w0}$, $V\gamma_{w0}$ memorized in a velocity table for "cartesian coordinates manual operation" of workpiece 1m [ST10], from equation (1).

$$Vx_w = Sx \times r_b \times Vx_{w0}$$
$$Vy_w = Sy \times r_b \times Vy_{w0}$$
$$Vz_w = Sz \times r_b \times Vz_{w0}$$
$$V\alpha_w = S\alpha \times r_b \times V\alpha_{w0}$$
$$V\beta_w = S\beta \times r_b \times V\beta_{w0}$$
$$V\gamma_w = S\gamma \times r_b \times V\gamma_{w0}$$
(1)

The above-mentioned $Sx$, $Sy$, ..., $S\gamma$ are as follows;

pressing each of the keys 12a~12f produces a signal "+1" for each output;

pressing each of the keys 12A~12F produces a signal "−1" for each output;

releasing each of keys 12a~12f, 12A~12F produces a signal "0" for each output.

Since keys 12b, 12c and 12E only are pressed in this example, $Sx = 0$, thus, $Vx_w = 0$ $Sy = +1$, thus, $Vy_w = r_b \times Vy_{w0}$ $Sz = +1$, thus, $Vz_w = r_b \times Vz_{w0}$ $S\alpha = 0$, thus, $V\alpha_w = 0$ $S\beta = -1$, thus, $V\beta_w = -r_b \times V\beta_{w0}$ $S\gamma = 0$, thus, $V\gamma_w = 0$.

[a-2]; the position and attitude of workpiece handling robot 1 at the starting time of manual teaching operations are calculated by use of the actuating signals as follows;

The "joint variables" $\phi_{1-0}, \phi_{2-0}, \ldots, \phi_{6-0}$ of workpiece handling robot 1 at the starting time of the manual teaching operations are inputted [ST11]. The position and attitude $W_{2-0}$ of the holding point 53 of workpiece 1m with respect to the base point 52 of workpiece handling robot 1 is formulated as equation (3), by a product of homogeneous transformation matrixes of equation (2) which uses "link parameters" indicated by the Denavit-Hartenberg notation.

$$A_{jw} = \text{Rot}(Z, \phi_j) \cdot \text{Trans}(a_{jw}, 0, d_{jw}) \cdot \text{Rot}(X, a_{jw}) \quad (2)$$

$$W_{2-0} = A_{1w} A_{2w} A_{3w} A_{4w} A_{5w} A_{6w} \quad (3).$$

The symbols in equation (2) are as follows;

$\phi_j$ is a variable of the j-th joint of workpiece handling robot 1.

$a_{jw}$ is a length of the j-th link of workpiece handling robot 1, which is a fixed value.

$d_{jw}$ is a distance between the (j−1)-th link and the j-th one of workpiece handling robot 1, which is a fixed value.

$a_{jw}$ is an angle between the (j−1)-th link and the j-th one of workpiece handling robot 1, which is a fixed value. [a-3]; The position and the attitude of the tip point 57 of tool 2n with respect to the referential point 56 of workpiece 1m at the starting time of manual teaching operations are calculated.

The "joint variables" $\theta_{1-0}, \theta_{2-0}, \ldots, \theta_{6-0}$ of tool handling robot 2 at the starting time of manual teaching operations are inputted [ST12]. The position and attitude $T_{2-0}$ of the installation point 55 of tool 2n with respect to the base point 54 of tool handling robot 2 is formulated as equation (5), by a product of homogeneous transformation matrixes of equation (4) which uses "link parameters" indicated by the Denavit-Hartenberg notation.

$$A_{jt} = \text{Rot}(Z, \theta_j) \cdot \text{Trans}(a_{jt}, 0, d_{jt}) \cdot \text{Rot}(X, a_{jt}) \quad (4)$$

$$T_{2-0} = A_{1t} A_{2t} A_{3t} A_{4t} A_{5t} A_{6t} \quad (5).$$

The symbols in equation (4) are as follows;

$\theta_j$ is a variable of the j-th joint of tool handling robot 2.

$a_{jt}$ is a length of the j-th link of tool handling robot 2, which is a fixed value.

$d_{jt}$ is a distance between the (j−1)-th link and the j-th one of tool handling robot 2, which is a fixed value.

$a_{jt}$ is an angle between the (j−1)-th link and the j-th one of tool handling robot 2, which is a fixed value.

A homogeneous transformation matrix "world $X_{w-o}$" of the position and attitude of the referential point 56 of the workpiece with respect to the world coordinates system 51 as shown in FIG. 5 is calculated by equation (6) [ST13].

$$\text{world } X_{w-o} = Z_w \cdot W_{2-0} \cdot E_w \quad (6)$$

where $Z_w$ is a homogeneous transformation matrix of the position and attitude of the base point 52 of workpiece handling robot 1 with respect to the world coordinates system 51 of FIG. 5, and $E_w$ is a homogeneous transformation matrix of the position and attitude of the referential point 56 of the workpiece with respect to the holding point 53 of workpiece 1m. These data are previously stored in the "control means for manual teaching operations" 4A.

A homogeneous transformation matrix "world $X_{t-o}$" of the position and attitude of the tip point 57 of tool 2n with respect to the world coordinates system 51 is calculated by equation (7) [ST14].

$$\text{world } X_{t-o} = Z_t T_{2-0} \cdot E_t \qquad (7)$$

where $Z_t$ is a homogeneous transformation matrix of the position and attitude of the base point 54 of tool handling robot 2 with respect to the world coordinates system 51, and $E_t$ is a homogeneous transformation matrix of the position and attitude of the tip point 57 of the tool with respect to the installation point 55 of tool 2n. These data were also previously stored in the "control means for manual teaching operations" 4A.

Assuming that a homogeneous transformation matrix of the position and attitude of the tip point 57 of tool 2n with respect to the referential point 56 of the workpiece is "$wX_t$", a following equation is formulated.

$$\text{world } X_{t-o} = \text{world } X_{w-o} \cdot wX_t \qquad (8)$$

Figure 9:
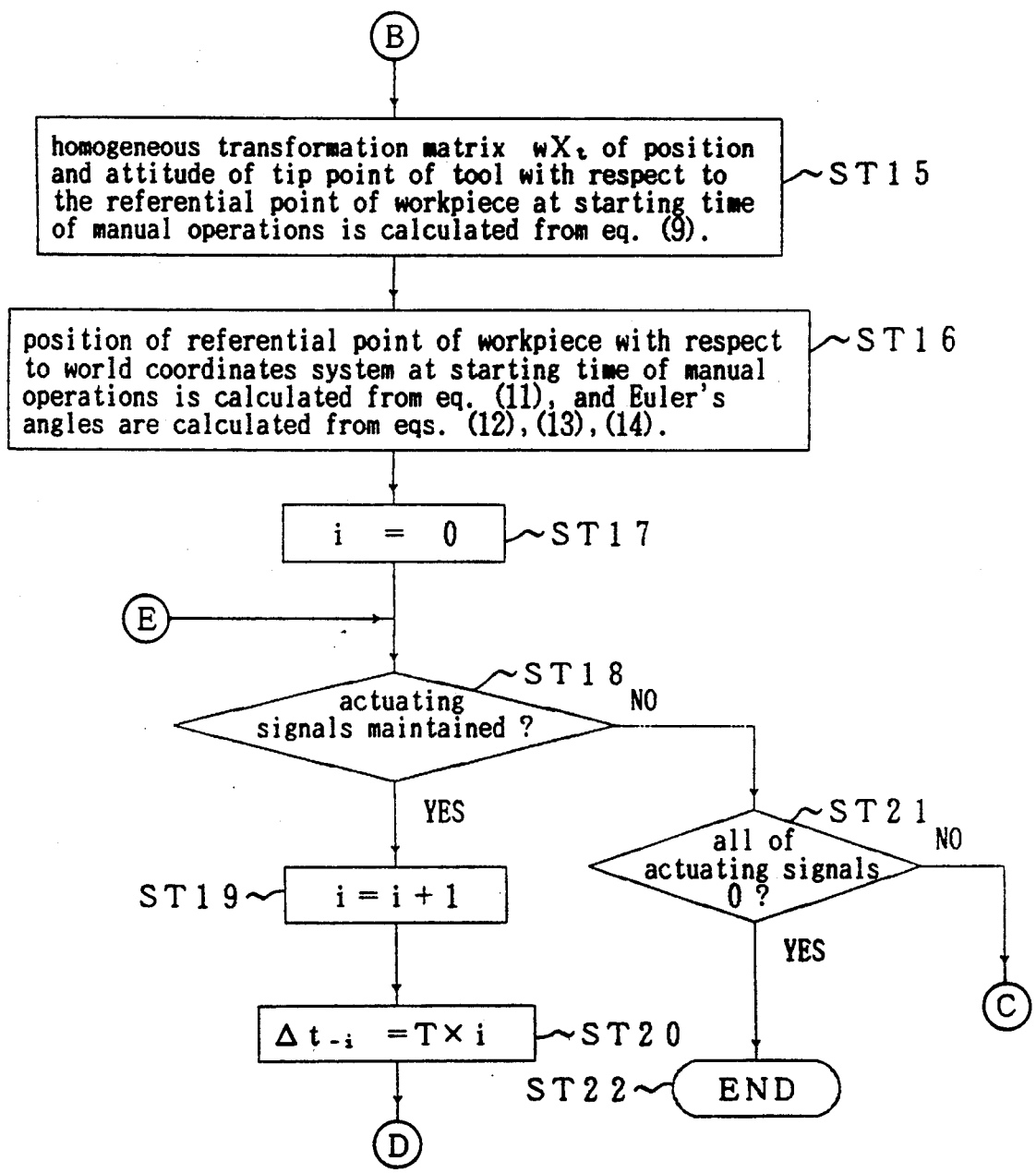
FIG. 9 is a flow chart which explains the "mode of co-acting cartesian coordinates of the manual operation" continued from B of FIG. 8.

Therefore, $wX_t$ is calculated by equation (9) [ST15 in FIG. 9].

$$wX_t = (\text{world } X_{w-o})^{-1} \cdot (\text{world } X_{t-o}) \qquad (9)$$

A homogeneous transformation matrix "world $X_{w-o}$" of the position and attitude of the referential point 56 of workpiece 1m with respect to the world coordinates system 51 is formulated as a following equation.

$$\text{world } X_{w-o} = \begin{bmatrix} n_x & o_x & a_x & p_x \\ n_y & o_y & a_y & p_y \\ n_z & o_z & a_z & p_z \\ 0 & 0 & 0 & 1 \end{bmatrix} \qquad (10)$$

By transforming the above equations, the data for position $X_{w-o}$, $Y_{w-o}$, $Z_{w-o}$ and the data of Euler's angles $\alpha_{w-o}$, $\beta_{w-o}$, $\gamma_{w-o}$ for the attitude of the referential point 56 of the workpiece with respect to the world coordinates system 51 at the starting time of the manual operations are obtained. The 6 equivalent parameters are calculated by means of the following equations [ST16].

$$\text{world } X_{w-o} = \text{Trans}(X_{w-o}, Y_{w-o}, Z_{w-o}) \cdot \text{Rot}(Z, \alpha_{w-o}) \cdot \text{Rot}(Y, \beta_{w-o}) \cdot \text{Rot}(Z, \gamma_{w-o}) =$$

$$\begin{bmatrix} \cos(\alpha_{w-o})\cos(\beta_{w-o})\cos(\gamma_{w-o}) - \sin(\alpha_{w-o})\sin(\gamma_{w-o}) \\ \sin(\alpha_{w-o})\cos(\beta_{w-o})\cos(\gamma_{w-o}) + \cos(\alpha_{w-o})\sin(\gamma_{w-o}) \\ -\sin(\beta_{w-o})\cos(\gamma_{w-o}) \\ 0 \end{bmatrix}$$

-continued $$\begin{bmatrix} -\cos(\alpha_{w-o})\cos(\beta_{w-o})\sin(\gamma_{w-o}) - \sin(\alpha_{w-o})\cos(\gamma_{w-o}) \\ -\sin(\alpha_{w-o})\cos(\beta_{w-o})\sin(\gamma_{w-o}) - \cos(\alpha_{w-o})\cos(\gamma_{w-o}) \\ \sin(\beta_{w-o})\cos(\gamma_{w-o}) \\ 0 \end{bmatrix}$$

$$\begin{bmatrix} \cos(\alpha_{w-o})\sin(\beta_{w-o}) & X_{w-o} \\ \sin(\alpha_{w-o})\sin(\beta_{w-o}) & Y_{w-o} \\ \cos(\beta_{w-o}) & Z_{w-o} \\ 0 & 1 \end{bmatrix}$$

$$X_{w-o} = p_x, \; Y_{w-o} = p_y, \; Z_{w-o} = p_z \qquad (11)$$
$$\alpha_{w-o} = \cos^{-1}(a_x/\sin(\beta_{w-o})) \qquad (12)$$
$$\beta_{w-o} = \cos^{-1}(a_z) \qquad (13)$$
$$\gamma_{w-o} = \sin^{-1}(o_z/\sin(\beta_{w-o})) \qquad (14)$$

[a-4]; By setting up i=0, a lapse of time $\Delta t_{-1}$ from the starting time of manual operations is set equal to "0" [ST17].

[b]: The second process is as follows;

The discrimination of whether keys 12b, 12c and 12E previously pressed have been released or not, i.e., whether the actuating signals are maintained or not, is carried out [ST18]. If all of the actuating signals are maintained, a infinitesimal time $\Delta T$ is added to the lapse of time $\Delta t_{-i}$ [ST19, ST20], and carrying out the third process is commanded after the lapse of the time is replaced with $\Delta t_{-i+1}$. If all of the keys 12b, 12c and 12E have already been released [ST21 in FIG. 9], the teaching operation is terminated [ST22]. If the keys pressed are different from previous ones, i.e., keys 12a, 12D and 12E have already been pressed instead of keys 12b, 12c and 12E [ST21], the procedure is repeated from step 1 of the first process by using the new actuating signals thereof.

[c]: The third process is as follows; This is carrying out by receiving the command from the second process.

Figure 10:
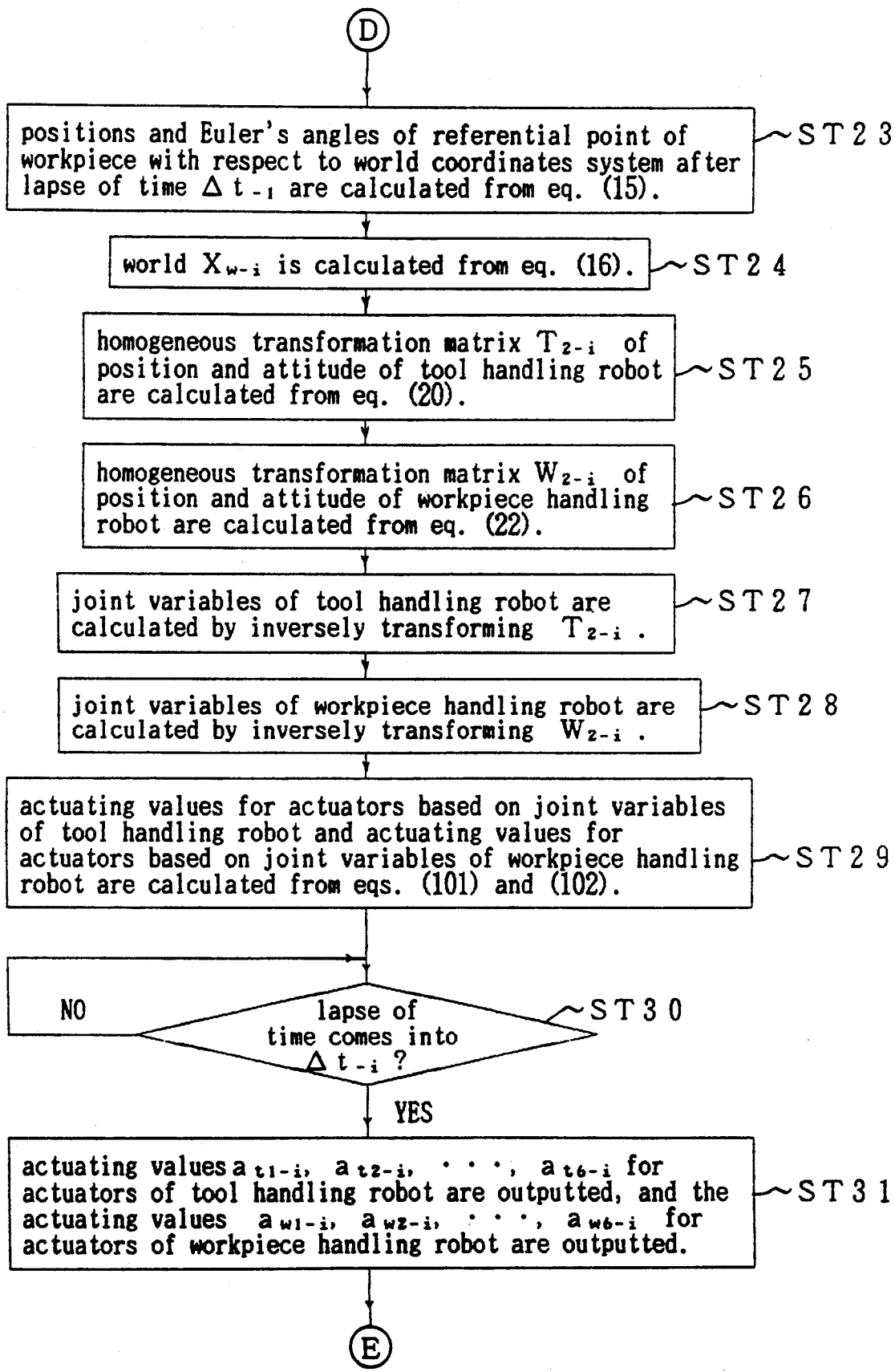
FIG. 10 is a flow chart which explains the "mode of co-acting cartesian coordinates of the manual operation" continued from D of FIG. 9.

Position $X_{w-i}$, $Y_{w-i}$, $Z_{w-i}$ and Euler's angle $\alpha_{w-i}$, $\beta_{w-i}$, $\gamma_{w-i}$ of attitude of the referential point 56 of workpiece 1m with respect to the world coordinates system 51 after the lapse of time $\Delta t_{-i}$, i.e., after $\Delta T \times i$, are calculated [ST23 in FIG. 10].

$$\begin{aligned} X_{w-i} &= X_{w-o} + Vx_w 1 \times \Delta t_{-i} \\ Y_{w-i} &= Y_{w-o} + Vy_w \times \Delta t_{-i} \\ Z_{w-i} &= Z_{w-o} + Vz_w \times \Delta t_{-i} \\ \alpha_{w-i} &= \alpha_{w-o} + V\alpha_w \times \Delta t_{-i} \\ \beta_{w-i} &= \beta_{w-o} + V\beta_w \times \Delta t_{-i} \\ \gamma_{w-i} &= \gamma_{w-o} + V\gamma_w \times \Delta t_{-i} \end{aligned} \qquad (15)$$

A homogeneous transformation matrix "world $X_{w-1}$" of position and attitude of the referential point 56 of workpiece 1m is calculated by equation (16) [ST24].

$$\text{world } X_{w-i} = \text{Trans}(X_{w-i}, Y_{w-i}, Z_{w-i}) \cdot \text{Rot}(Z, \alpha_{w-i}) \cdot \text{Rot}(Y, \beta_{w-i}) \cdot \text{Rot}(Z, \gamma_{w-i}) \qquad (16)$$

Even if workpiece 1m acts according to equation (16), position and attitude $T_{2-i}$, which the relative position and attitude of tool 2n against workpiece 1m are never changed, of tool handling robot 2 are calculated.

A following equation is formulated as the above-mentioned equation (8).

$$\text{world } X_{t-i} = \text{world } X_{w-i} \cdot wX_t \qquad (17)$$

A following equation is formulated from the relation of the coordinates as the above-mentioned equation (7).

$$\text{world } X_{t-i} = Z_t \cdot T_{2-i} \cdot E_t \tag{18}$$

From equation (18), a following equation (19) is formulated.

$$T_{2-i} = (Z_t)^{-1} \cdot \text{world } X_{t-i} \cdot (E_t)^{-1} \tag{19}$$

Substituting equation (17) into equation (19) results in equation (20) [ST25].

$$T_{2-i} = (Z_t)^{-1} \cdot \text{world } X_{w-i} \cdot {}^w X_t \cdot (E_t)^{-1} \tag{20}$$

On the other hand, equation (21) is formulated as an above-mentioned equation (6), $$\text{world } X_{w-i} = Z_w \cdot W_{2-i} \cdot E_w \tag{21}$$

and a homogeneous transformation matrix $W_{2-i}$ of the position and attitude of workpiece handling robot 1 can be calculated by equation (22) [ST26].

$$W_{2-i} = (Z_w)^{-1} \cdot \text{world } X_{w-i} \cdot (E_w)^{-1} \tag{22}$$

[d]: The fourth process consists of the following [d-1] to [d-2].

[d-1]: "Joint variables" $\theta_{1-i}, \theta_{2-i}, \ldots, \theta_{6-i}$ of tool handling robot 2 are obtained by inversely transforming $T_{2-i}$ of equation (20) [ST27].

[d-2]: "Joint variables" $\phi_{1-i}, \phi_{2-i}, \ldots, \phi_{6-i}$ of workpiece handling robot 1 are obtained by inversely transforming $W_{2-i}$ of equation (22) [ST28].

[e]: The fifth process is as follows;

The actuating quantities of Quantities of the "joint variables" per unit of the "actuating values for actuators" of tool handling robot 2 and workpiece handling robot 1 respectively are assumed $R_{t1}, R_{t2}, \ldots, R_{t6}, R_{w1}, R_{w2}, \ldots, R_{w6}$, which are predetermined values for every robot and were previously stored in the "control means for manual teaching operations" 4A.

Assuming that the actuating values for actuators $17T_1, 17T_2, \ldots, 17T_6$ of tool handling robot 2 are $a_{t1-i}, a_{t2-i}, \ldots, a_{t6-i}$, and the actuating values for actuators $17W_1, 17W_2, \ldots, 17W_6$ of workpiece handling robot 1 are $a_{w1-i}, a_{w2-i}, \ldots, a_{w6-i}$, they are as follows [ST29];

$$\begin{aligned}
a_{t1-i} &= \theta_{1-i}/R_{t1} \\
a_{t2-i} &= \theta_{2-i}/R_{t2} \\
a_{t3-i} &= \theta_{3-i}/R_{t3} \\
a_{t4-i} &= \theta_{4-i}/R_{t4} \\
a_{t5-i} &= \theta_{5-i}/R_{t5} \\
a_{t6-i} &= \theta_{6-i}/R_{t6}
\end{aligned} \tag{101}$$

$$\begin{aligned}
a_{w1-i} &= \phi_{1-i}/R_{w1} \\
a_{w2-i} &= \phi_{2-i}/R_{w2} \\
a_{w3-i} &= \phi_{3-i}/R_{w3} \\
a_{w4-i} &= \phi_{4-i}/R_{w4} \\
a_{w5-i} &= \phi_{5-i}/R_{w5} \\
a_{w6-i} &= \phi_{6-i}/R_{w6}
\end{aligned} \tag{102}$$

Such actuating values $a_{t1-i}, a_{t2-i}, \ldots, a_{t6-i}$ for the actuators of tool handling robot 2 and actuating values $a_{w1-i}, a_{w2-i}, \ldots, a_{w6-i}$ for the actuators of workpiece handling robot 1 are outputted just after the lapse of time comes into $\Delta T \times i$ [ST30, ST31], and the procedure is returned to step 18 of the second process.

The control function by means of the "control means for manual teaching operations" 4A, which includes an algorithm thereof, are described above. An example of the actual teaching operations is explained referring to FIG. 11(a) as follows; In the case that position and attitude of a teaching point $A_1$ at the first positioning on workpiece 1m indicated by a solid line is moved to that of a teaching point $A_2$ at the second positioning thereon indicated by a single dotted line, an operator has only to press, e.g., once, a group of keys 12, if the path from the first teaching point $A_1$ till the next one $A_2$ is simple. In this operation, step 18 is repeated every after adding $\Delta T$, e.g., one-twentieth of a second [ST19, ST20]. The workpiece 1m and tool 2n are moved according to the output signals of step 31 for every repetition.

Figure 11A:
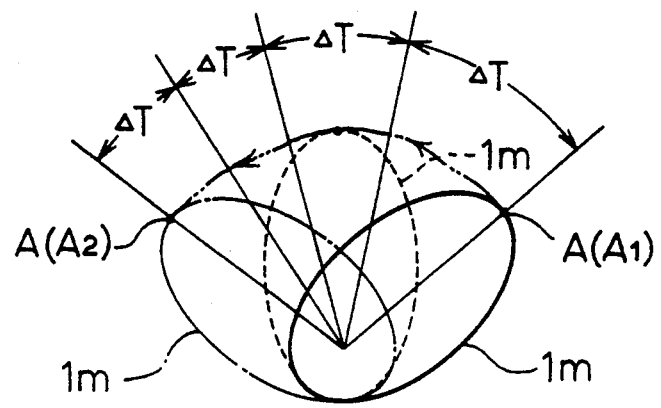
FIG. 11 (a)–(c) are schematic drawings for explanations of the teaching path under the motion of "co-action" when a teaching point A is moved.
Figure 12:
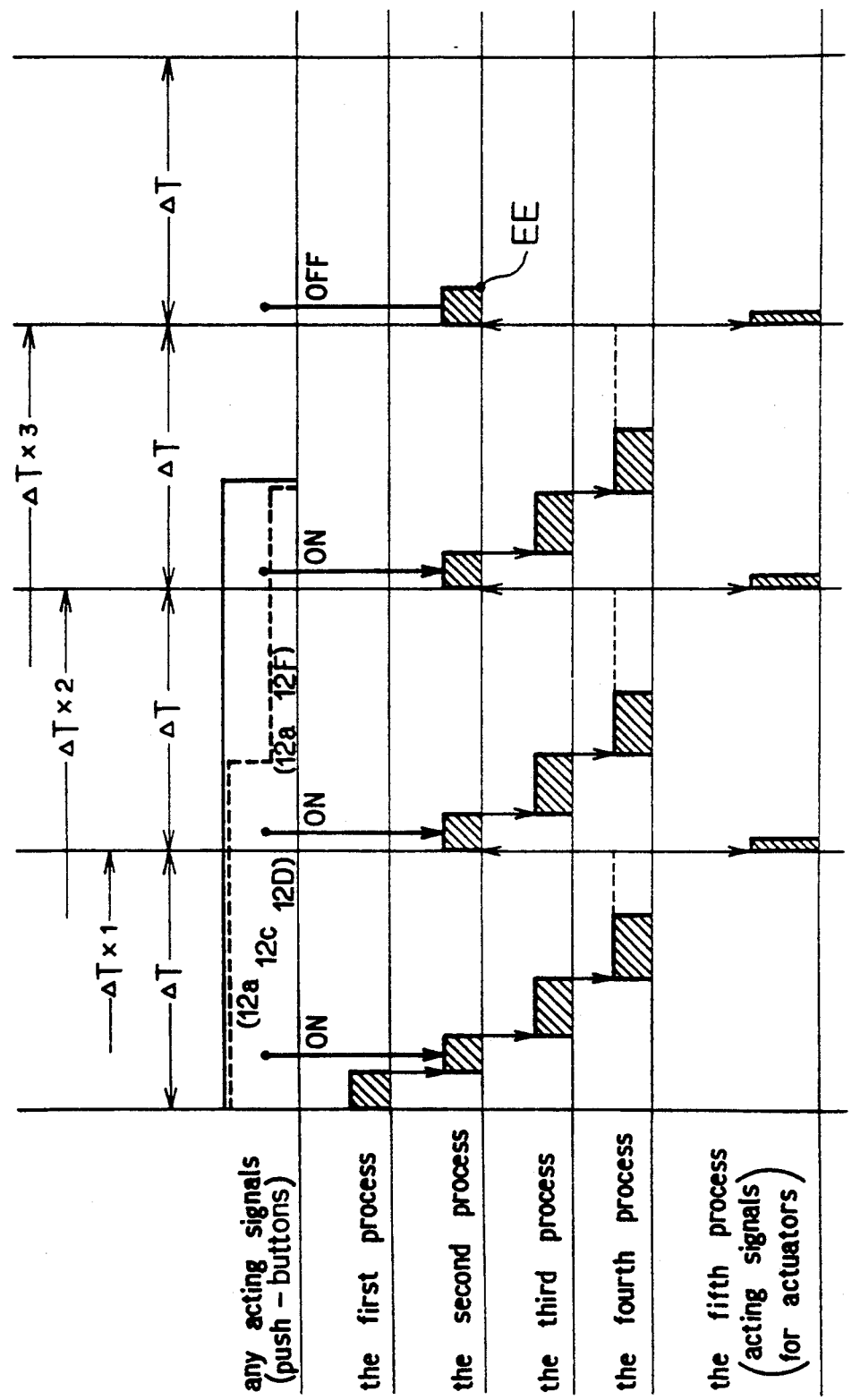
FIG. 12 is a timing chart of each process until all of the keys are released.

The process is repeated till $\Delta T \times n$ for every $\Delta T$ as shown in a timing chart of FIG. 12. The repetition from the second process for till the fifth process every $\Delta T$ is comprehensible. The intervals of $\Delta T$ in FIG. 11(a) are indicated differently from each other, because workpiece 1m is not always moved the same distance for every $\Delta T$ and the attitude of workpiece 1m is often changed three-dimensionally.

When the state which keys 12a, 12c and 12D are pressed is changed to the state which keys 12a and 12F are pressed, the actuating signals are changed as a broken line indicated at the upper part of a timing chart in FIG. 12. Even if the actuating signals are changed as above, the procedure is returned to step 1 from step 21, as long as all of the signals are not "0". The procedure is carried out till step 31 according to the actuating signals changed as above. In this case, actuators 17W, 17T actuate n times from the first $\Delta T \times 1$ till the last $\Delta T \times n$.

What all of actuating signals have changed to "0" at step 21 it is unnecessary workpiece 1m, and the controlling function is completed at a finishing point EE in the timing chart. After this, "co-action" is furthermore repeated or "sole-action" is carried out from step 2 as mentioned later.

Figure 11B:
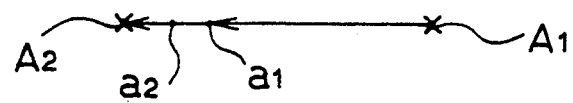

The case that the above-mentioned "co-action" is repeated in spite that all of the actuating signals have already changed to "0" means that the position and attitude of tool 2n against workpiece 1m are not the desired position and attitude thereof at the second position. In this case, the above-mentioned procedure is continued till the second position is completed. Such an example is briefly described as follows;

If the path between point $A_1$ at the first positioning and point $A_2$ at the second positioning is straight and long, a rate changing switch 10 is preferable to be changed as follows. The points $a_1$ and $a_2$ are chosen in the middle of the path between point $A_1$ and point $A_2$ as shown in FIG. 11(b). The rate of 1.0 is selected in the route from point $A_1$ till $a_1$, 0.5 from point $a_1$ till $a_2$, 0.1 from point $a_2$ till $A_2$. Each of the points $a_1$, $a_2$, $A_2$ corresponds to the finishing point EE in FIG. 12 respectively. The position and attitude at a temporary point $a_1$ are ignored and are not memorized after arriving at a next temporary point of point $a_2$. Similarly, the position and attitude at the temporary point $a_2$ are also ignored. On the other hand, the position and attitude at the point $A_2$ are memorized as teaching data.

Therefore, the direct movement from point $A_1$ to $A_2$ is played back at the rate of 1.0 in real processing operations of, for example, in the welding operations, so as to keep the position and attitude of tool 2n against workpiece 1m at the starting time of the manual operations. When the rate has been set up to a lower value in the final route from above-mentioned point $a_2$ till point $A_2$, the lower rate prevents the carelessly overshooting of the target $A_2$ and it may be promoted to relieve the tension of a teaching operator.

Figure 11C:
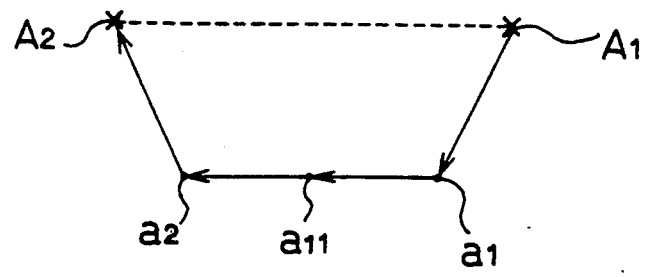

In the case that there is a protrusion on the way from point $A_1$ to $A_2$ on workpiece $1m$, the route for point $A_2$ should be avoided. The route via points $a_1$ and $a_2$ which do not exist on the segment $A_1 A_2$ indicated by a broken line in FIG. 11(c) is selected for a teaching path. In this case, not only the "mode of cartesian coordinates manual operation" may be adopted between point $A_1$ and $a_1$ but "mode of each axis manual operation" mentioned later may be adopted between point $a_1$ and $a_2$, and moreover, the "mode of cartesian coordinates manual operation" may be adopted again between point $a_2$ and $A_2$. Each of the points $a_1$, $a_2$, $A_2$ corresponds to the finishing point EE in FIG. 12. When the "mode of each axis manual operation" is adopted between the point $a_1$ and $a_2$, it is also possible to change the rate at the point $a_{11}$ in the middle of the route between $a_1$ and $a_2$.

The state of the starting time of manual operations means the state of the first position as shown in FIG. 13(a), therefore, the teaching point A is a point $A_1$. The state of the second position is achieved via points $a_1$, $a_2$ etc. by means of rotating workpiece $1m$ to the direction of the arrow $1p$. The second position at the point $A_2$ is shown in FIG. 13(b). The "co-action" is carried out between FIG. 13(a) and FIG. 13(b). After the teaching point A is shifted to point $A_2$ at the second position, the next teaching point B and the point C after the next teaching point B as shown in FIG. 13(c) may be taught by means of "sole-acting manual operation" i.e., moving tool $2n$ under the condition that workpiece $1m$ is stopped, or moving workpiece $1m$ under the condition that tool $2n$ is stopped.

Figure 13:
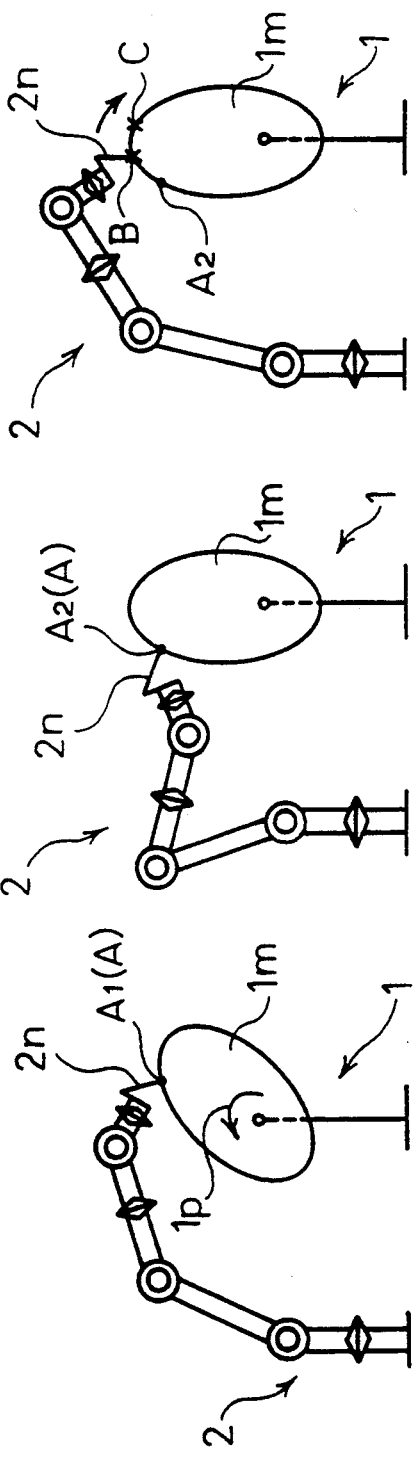
FIG. 13 is a schematic drawings for explanations under the motion of "co-action of position and attitude" of the workpiece handling robot and the tool handling robot, where (a) shows a state at the first position, (b) shows a state at the position after the tool was subjected to a movement of the workpiece, and (c) shows a state that a next point is being taught.

The above-mentioned description in FIG. 13 is substantially different from that of the prior art in FIG. 24. This means that tool $2n$ never leaves workpiece $1m$ between FIG. 13(a) and FIG. 13(b), tool $2n$ is subjected to the movement of workpiece $1m$, and the position and attitude of tool $2n$ against workpiece $1m$ are always maintained.

[2] Next, the "co-acting each axis manual operation" is explained below, which is in a state that the "mode of each axis manual operation" is selected by the mode changing switch 8 and "co-action" is selected by the operation changing switch 9. This means that the position and attitude of workpiece $1m$ are changed to desired ones thereof by means of the joints of workpiece handling robot 1 without changing the relative position and attitude between tool $2n$ and workpiece $1m$.

An operator chooses "co-action" in the operation changing switch 9, "mode of each axis manual operation" in the mode changing switch 8 and "workpiece handling robot" in the robot changing switch 7 on teach pendant 3. Moreover, a desired rate "r", e.g., 0.5, which is indicated as "$r_c$", is chosen in the rate changing switch 10.

An operator presses the desired keys, e.g., $12b$ and $12D$. The procedure, until they are released, are as follows;

[a]: The first process consists of the after-mentioned [a-1] to [a-4].

The actuating signals are inputted into the control equipment by means of pressing keys $12b$ and $12D$ [ST1 in FIG. 7]. As the operation changing switch 9 is "on", i.e., selecting "co-action" [ST2], the robot changing switch 7 is "on", i.e., being designated "workpiece handling robot" [ST3 in FIG. 7] and the mode changing switch 8 is "off", i.e., selecting the "mode of each axis manual operation" [ST6 in FIG. 8], the procedure is led to step 32 in FIG. 14. If the robot changing switch 7 is "off", i.e., being designated "tool handling robot" [ST3], the procedure for controlling later becomes impossible. In this case, it is indicated on the indicating device that the robot changing switch 7 should be "on", i.e., a message of designating "workpiece handling robot" appears in an undrawn CRT etc. [ST4], the procedure is terminated at this time [ST5].

Figure 14:
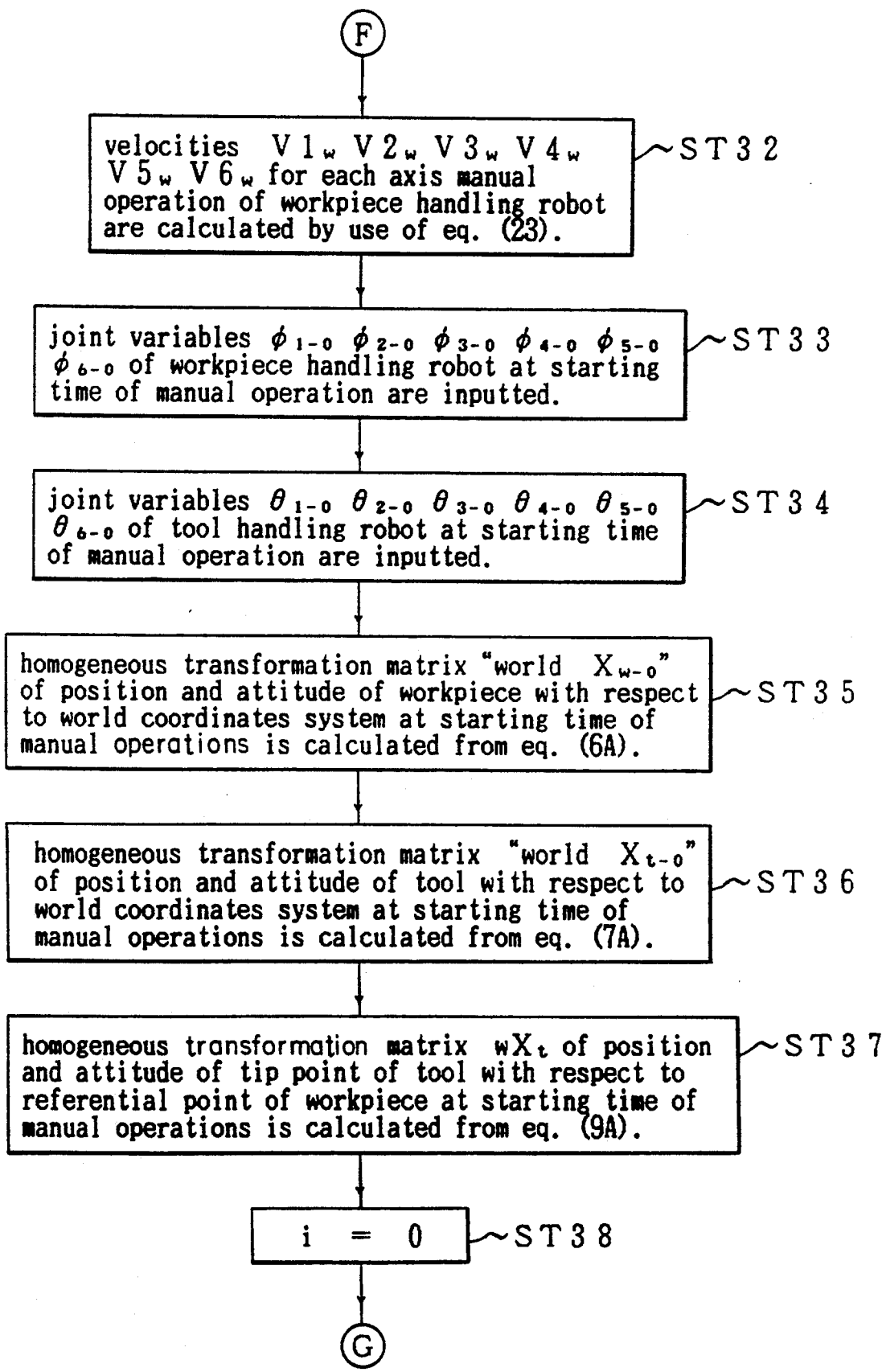
FIG. 14 is a flow chart which explains the "mode of co-acting each axis of the manual operation" continued from F of FIG. 8.

A workpiece handling robot 1 may be a manipulator of 6 degrees of freedom or a positioner of less than 3 degrees of freedom in this "mode of each axis manual operation". A manipulator of 6 degrees of freedom only is applied to controlling in the above-mentioned "mode of cartesian coordinates manual operation". But a positioner of 3 degrees of freedom may be also applied to this embodiment, then, actuating signals generated by the group of keys 12 are S1 to S3 only. [a-1]; Velocities for the joints of workpiece handling robot 1 are calculated as follows;

The velocities $V1_w$, $V2_w$, $V3_w$, $V4_w$, $V5_w$ are computed by use of actuating signals S1, S2, S3, S4, S5, S6 generated by keys $12b$ and $12D$, a designated rate "$r_c$" and maximum values $V1_{w0}$, $V2_{w0}$, $V3_{w0}$, $V4_{w0}$, $V5_{w0}$, $V6_{w0}$ memorized in a velocity table for "each axis manual operation" of workpiece handling robot 1 [ST32 n FIG. 14], from equations (23).

$$\begin{aligned} V1_w &= S1 \times r_c \times V1_{w0} \\ V2_w &= S2 \times r_c \times V2_{w0} \\ V3_w &= S3 \times r_c \times V3_{w0} \\ V4_w &= S4 \times r_c \times V4_{w0} \\ V5_w &= S5 \times r_c \times V5_{w0} \\ V6_w &= S6 \times r_c \times V6_{w0} \end{aligned} \quad (23)$$

The above-mentioned S1, S2, ..., S6 are as follows;
pressing each of the keys $12a \sim 12f$ produces a signal "+1" respectively,
pressing each of the keys $12A \sim 12F$ produces a signal "−1" respectively,
releasing each of the keys $12a \sim 12f$, $12A \sim 12F$ produces a signal "0" respectively.
Since keys $12b$ and $12D$ only are pressed in this example, similar to the above-mentioned example, $$V1_w=0, V3_w=0, V5_w=0, V6_w=0.$$

[a-2]; The position and attitude of workpiece handling robot 1 at the starting time of manual teaching operations are calculated by use of the actuating signals as follows;

"Joint variables" $\phi_{1-0}, \phi_{2-0}, \ldots, \phi_{6-0}$ of workpiece handling robot 1 at the starting time of manual teaching operations are inputted [ST33]. The position and attitude $W_{2-0}$ of the holding point 53 of workpiece $1m$ with respect to the base point 52 of workpiece handling robot 1 is formulated as equation (3A), by a product of the homogeneous transformation matrixes of equation (2A) which uses "link parameters" indicated by the Denavit-Hartenberg notation.

$$A_{jw} = \text{Rot}(Z, \phi_j) \cdot \text{Trans}(a_{jw}, 0, d_{jw}) \cdot \text{Rot}(X, a_{jw}) \quad (2A)$$

$$W_{2-0} = A_{1w} A_{2w} A_{3w} A_{4w} A_{5w} A_{6w} \quad (3A)$$

Equations (2A) and (3A) are just the same with above-mentioned equations (2) and (3) respectively. And $\phi_j$, $a_{jw}$, $d_{jw}$ and $\alpha_{jw}$ are also the same with the explanations after equations (2) and (3).

[a-3]; The position and attitude of the tip point 57 of tool 2n with respect to the referential point 56 of workpiece 1m at the starting time of manual teaching operations are calculated as follows;

"Joint variables" $\theta_{1-0}, \theta_{2-0}, \ldots, \theta_{6-0}$ of tool handling robot 2 at the starting time of the manual teaching operations are inputted [ST34]. The position and attitude $T_{2-0}$ of the installation point 55 of tool 2n with respect to the base point 54 of tool handling robot 2 is formulated as equation (5A), by a product of the homogeneous transformation matrixes of equation (4A) which uses "link parameters" indicated by the Denavit-Hartenberg notation.

$$A_{jt} = Rot(Z, \theta_j) \cdot trans(a_{jt}, 0, d_{jt}) \cdot Rot(X, a_{jt}) \tag{4A}$$

$$T_{2-0} = A_{1t} A_{2t} A_{3t} A_{4t} A_{5t} A_{6t} \tag{5A}$$

Equations (4A) and (5A) are just the same with above-mentioned equations (4) and (5). And $\phi_j$, $a_{jt}$, $d_{jt}$ and $\alpha_{jt}$ are also the same with the explanations after equations (4) and (5).

A homogeneous transformation matrix "world $X_{w-o}$" of the position and attitude of the referential point 56 of the workpiece with respect to the world coordinates system 51 is calculated in the following equation [ST35].

$$\text{world } X_{w-o} = Z_w \cdot W_{2-0} \cdot E_w \tag{6A}$$

This equation (6A) is just the same with above-mentioned equations (6). $Z_w$ and $E_w$ are also the same with the explanations after equation (6).

A homogeneous transformation matrix "world $X_{t-o}$" of the position and attitude of the tip point 57 of tool 2n with respect to the world coordinates system 51 is calculated in the following equation [ST36].

$$\text{world } X_{t-o} = Z_t \cdot T_{2-0} \cdot E_t \tag{7A}$$

This equation (7A) is just the same with above-mentioned equations (7). $Z_t$ and $E_t$ are also the same with the explanations after equation (7).

Assuming that a homogeneous transformation matrix of the position and attitude of the tip point 57 of tool 2n with respect to the referential point 56 of the workpiece is "wX$_t$", the following equation is formulated.

$$\text{world } X_{t-o} = \text{world } X_{w-o} \cdot wX_t \tag{8A}$$

Therefore, $wX_t$ is calculated by equation (9A) [ST37].

$$wX_t = (\text{world } X_{w-o})^{-1} \cdot (\text{world } X_{t-o}) \tag{9A}$$

Equations (8A) and (9A) are just the same with above-mentioned equations (8) and (9) respectively.

[a-4]; When i=0, a lapse of time $\Delta t_{-i}$ from the starting time of manual operations is set up to equal "0" [ST38].

Figure 15:
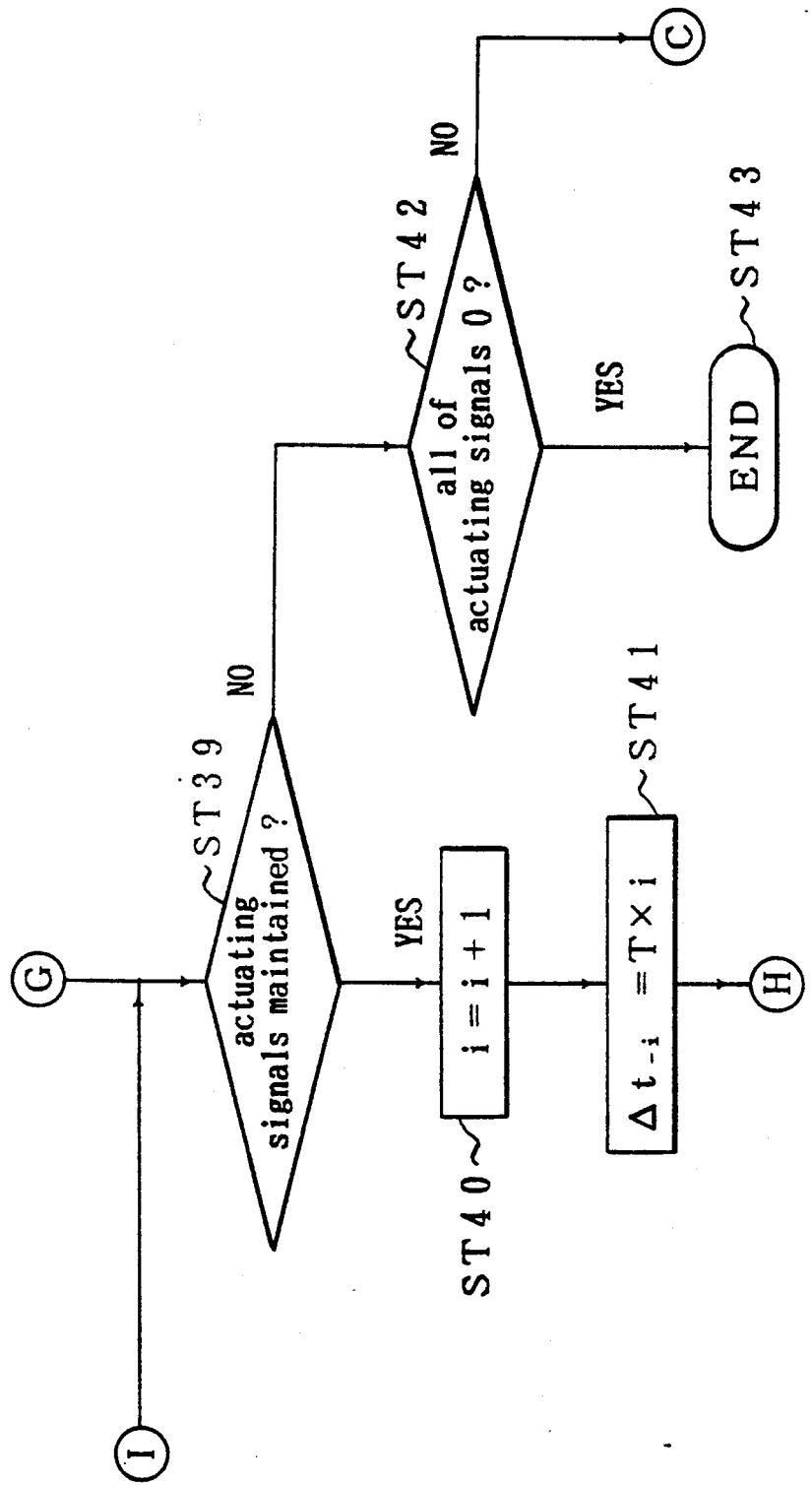
FIG. 15 is a flow chart which explains the "mode of co-acting each axis of the manual operation" continued from G of FIG. 14.

[b]: The second process is as follows;

The discrimination of whether keys 12b and 12D previously pressed have been released or not, i.e., whether the actuating signals are maintained or not, is carried out [ST39 in FIG. 15]. If all of the actuating signals are maintained, a infinitesimal time of $\Delta T$ is added to the lapse of time $\Delta t_{-i}$ [ST40, ST41], and carrying out the third process is commanded after the lapse of time is replaced with $\Delta t_{-i+1}$. If all of keys 12b and 12D have been already released [ST42], the teaching operation is terminated [ST43]. If the keys pressed are different from previous ones, i.e., the key 12c has been already pressed instead of keys 12b and 12D [ST42], the procedure is repeated from step 1 of the first process by use of the new actuating signals thereof.

[c]: The third process is as follows; This is carried out by receiving the command from the second process.

Figure 16:
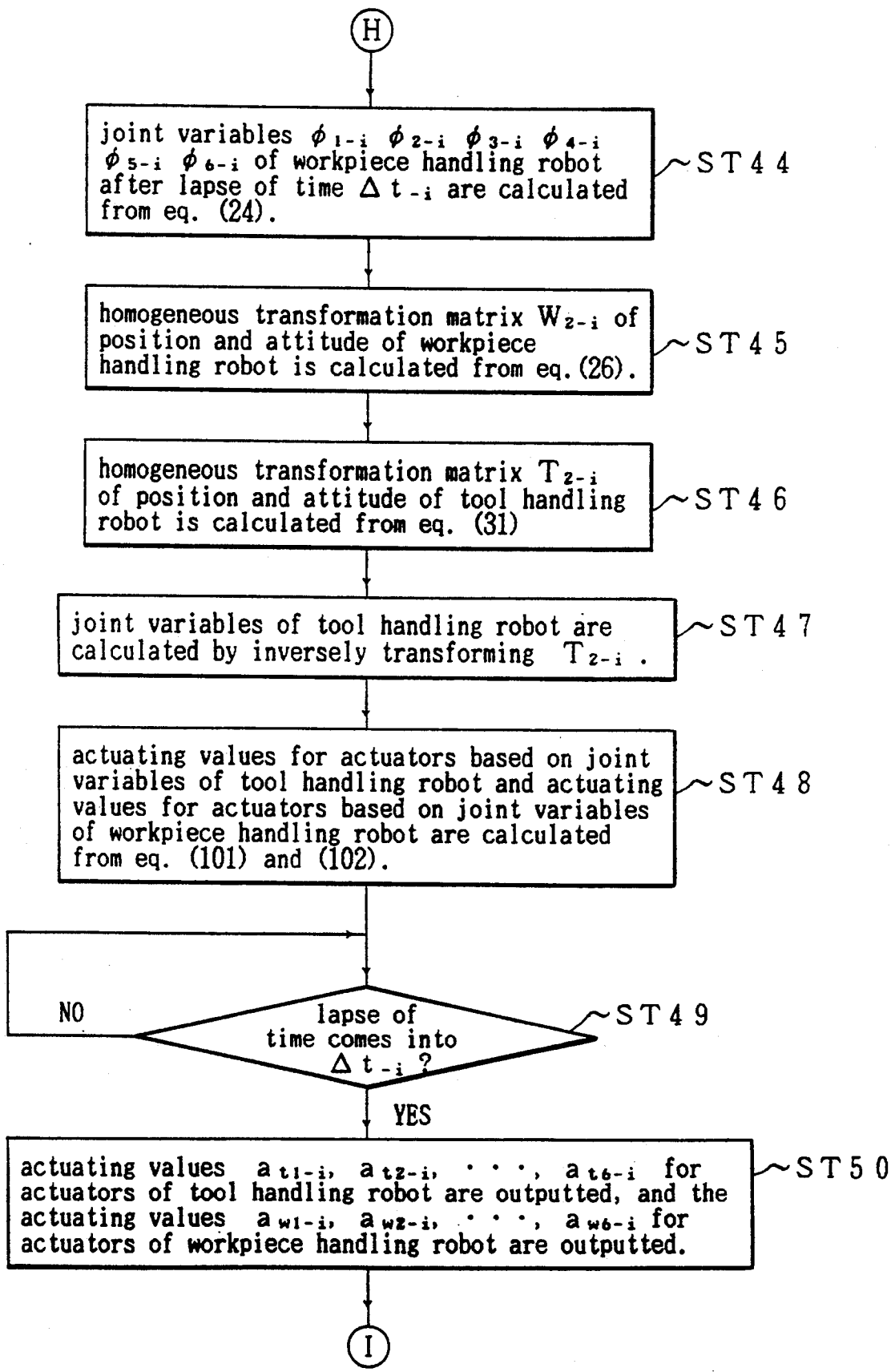
FIG. 16 is a flow chart which explains the "mode of co-acting each axis of the manual operation" continued from H of FIG. 15.

"Joint variables" $\phi_{1-i}, \phi_{2-i}, \ldots, \phi_{6-i}$ of workpiece handling robot 1 after the lapse of time $\Delta t_{-i}$, i.e., after $\Delta T \times i$, are calculated [ST44 in FIG. 16].

$$\begin{aligned}
\phi_{1-i} &= \phi_{1-o} + V1_w \times \Delta t_{-i} \\
\phi_{2-i} &= \phi_{2-o} + V2_w \times \Delta t_{-i} \\
\phi_{3-i} &= \phi_{3-o} + V3_w \times \Delta t_{-i} \\
\phi_{4-i} &= \phi_{4-o} + V4_w \times \Delta t_{-i} \\
\phi_{5-i} &= \phi_{5-o} + V5_w \times \Delta t_{-i} \\
\phi_{6-i} &= \phi_{6-o} + V6_w \times \Delta t_{-i}
\end{aligned} \tag{24}$$

Position and attitude $W_{2-i}$ of the holding point 53 of workpiece 1m with respect to the base point 52 of workpiece handling robot 1 is formulated as equation (26), by a product of homogeneous transformation matrixes of equation (25) which uses "link parameters" indicated by the Denavit-Hartenberg notation [ST45].

$$A_{jw} = Rot(Z, \phi_{j-i}) \cdot Trans(a_{jw}, 0, d_{jw}) \cdot Rot(x, a_{jw}) \tag{25}$$

$$W_{2-i} = A_{1w} A_{2w} A_{3w} A_{4w} A_{5w} A_{6w} \tag{26}$$

The symbols in equation (25) are as follows;

$\phi_{j-i}$ is a variable of the j-th joint of workpiece handling robot 1.

$a_{jw}$ is a length of the j-th link of workpiece handling robot 1, which is a fixed value.

$d_{jw}$ is a distance between the (j−1)-th link and the j-th one of workpiece handling robot 1, which is a fixed value.

$\alpha_{jw}$ is an angle between the (j−1)-th link and the j-th one of workpiece handling robot 1, which is a fixed value.

When workpiece handling robot 1 acts according to equation (26), position and attitude of $T_{2-i}$, which the relative position and attitude of tool 2n against workpiece 1m are never changed, of tool handling robot 2 are calculated. A homogeneous transformation matrix "world $X_{w-i}$" of the position and attitude of the referential point 56 of the workpiece with respect to the world coordinates system 51 is calculated by a following equation.

$$\text{world } X_{w-i} = Z_w \cdot W_{2-i} \cdot E_w \tag{27}$$

And a following equation is formulated as the above-mentioned equation (8).

$$\text{world } X_{t-i} = \text{world } X_{w-i} \cdot wX_t \tag{28}$$

A following equation is formulated from the relation of the coordinates as above-mentioned equation (7).

$$\text{world } X_{t-i} = Z_t \cdot T_{2-i} \cdot E_t \tag{29}$$

From equation (29), a following equation (30) is formulated.

$$T_{2-i} = (Z_t)^{-1} \cdot \text{world } X_{t-i} \cdot (E_t)^{-1} \tag{30}$$

Substituting equation (27) into equation (30) results in equation (31), and thus, $T_{2-i}$ is calculated [ST46].

$$T_{2-i} = (Z_t)^{-1} \cdot \text{world } X_{w-i} {}^w X_t (E_t)^{-1} \quad (31).$$

[d]: The fourth process is as follows;

"Joint variables" $\theta_{1-i}, \theta_{2-i}, \ldots, \theta_{6-i}$ of tool handling robot 2 are obtained by inversely transforming $T_{2-i}$ of equation (31) [ST47].

"Joint variables" $\phi_{1-i}, \phi_{2-i}, \ldots, \phi_{6-i}$ of workpiece handling robot 1 can be obtained by inversely transforming $W_{2-i}$ of equation (26).

[e]: The fifth process is as follows;

The actuating quantities for joint variables per unit of the actuating values for the actuators of tool handling robot 2 and workpiece handling robot 1 respectively are assumed to be $R_{t1}, R_{t2}, \ldots, R_{t6}, R_{w1}, R_{w2}, \ldots, R_{w6}$. The actuating values for the actuators of tool handling robot 2 are $a_{t2-i}, a_{t2-i}, \ldots, a_{t6-i}$ and are calculated from above-mentioned equation (101), and the actuating values for the actuators of workpiece handling robot 1 are $a_{w1-i}, a_{w2-i}, \ldots, a_{w6-i}$ are calculated from equation (102) [ST48].

Such the actuating values for actuators of tool handling robot 2 and the actuating values for actuators of workpiece handling robot 1 are outputted just after the lapse of time comes into $\Delta T \times i$ [ST49, ST50], and the procedure is returned to step 39 of the second process.

The repetition of each process from generation of the actuating signals till vanishment thereof is shown in a timing chart of FIG. 12 in the case of "mode of co-acting each axis manual operation". FIG. 11, FIG. 12 and FIG. 13 are also applied to this procedure.

In the state that workpiece $1mis$ moved to the desired position and attitude by means of "mode of co-acting each axis manual operation" or "mode of co-acting cartesian coordinates manual operation", if "co-action" is selected by the operation changing switch 9 on teach pendant 3 and "tool handling robot" is designated by the robot changing switch 7, the movement of the new desired position and attitude, i.e., an operation from FIG. 13(b) to FIG. 13(c), are achieved by means of "mode of sole-acting each axis manual operation" of tool $2n$ or by means of "mode of sole-acting cartesian coordinates manual operation" with respect to the world coordinates system 51. These sole-action are described as follows.

The explanation below are "mode of sole-acting each axis manual operation" or "mode of sole-acting cartesian coordinates manual operation" which are the state of the art of the present invention. The present controlling system is comprehensible to be a compound system which is capable to carry out not only "the mode of sole-acting each axis or cartesian coordinates manual operation" also but "the mode of co-acting each axis or cartesian coordinates manual operation".

The "sole-acting each axis manual operation" is described below:

[1] The operation of the changing position and attitude of tool $2n$ into the desired position and attitude thereof by means of actuating the joints of tool handling robot 2 is as follows;

An operator chooses "tool handling robot" in the robot changing switch 7, "mode of each axis manual operation" in the mode changing switch 8 and "sole-action" in the operation changing switch 9 on teach pendant 3. Moreover, a desired rate "r", e.g., 0.2, which is indicated as "$r_b$" is chosen in the rate changing switch 10.

An operator presses the desired keys, e.g., 12a and 12c. The procedure, until they are released, are as follows;

[a]: The first process consists of the following [a-1] to [a-3].

Figure 17:
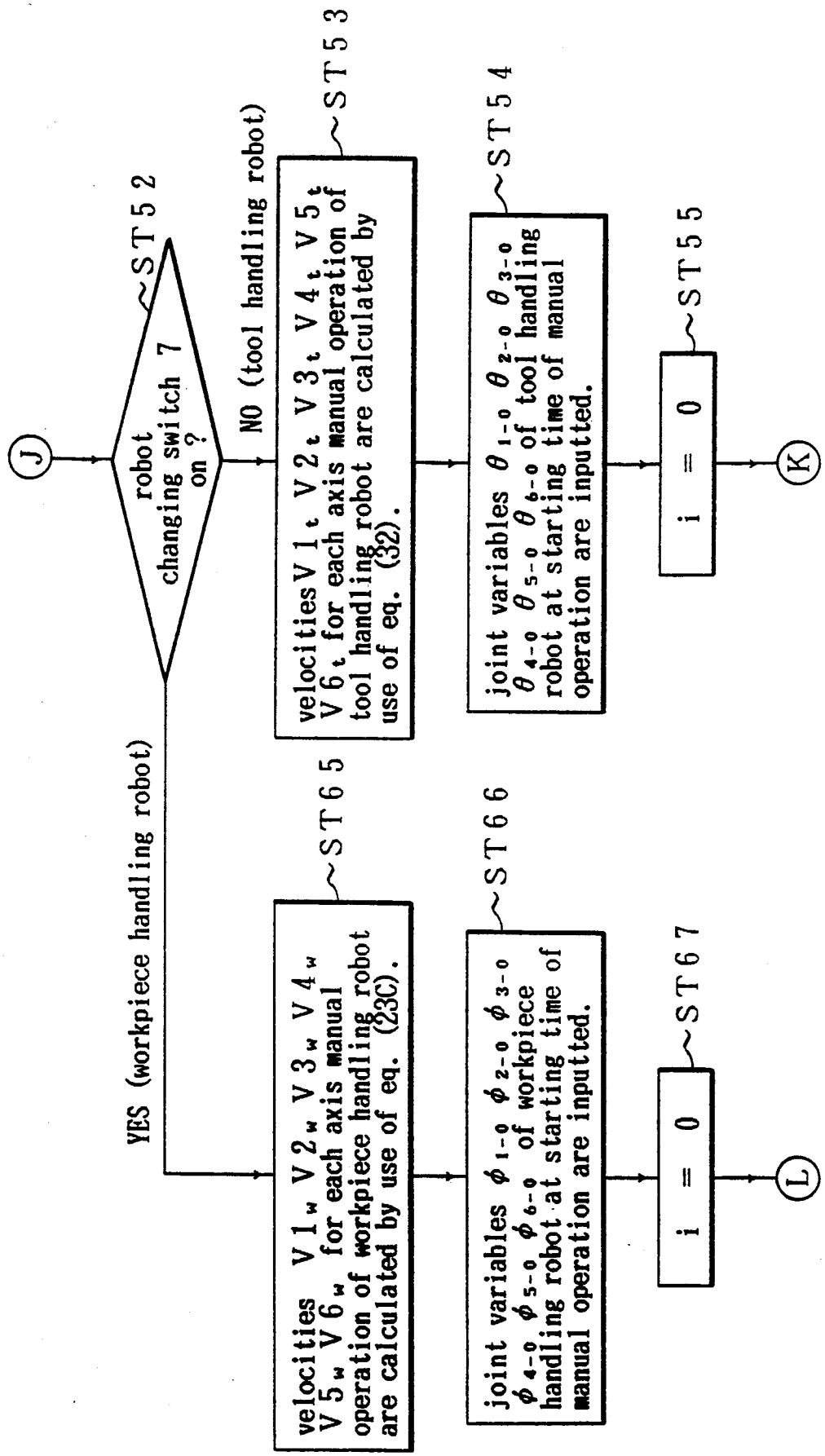
FIG. 17 is a flow chart which explains the "mode of sole-acting each axis of manual operation" continued from J of FIG. 7.

The actuating signals are inputted to the control equipment by means of pressing keys 12a and 12c [ST1 in FIG. 7]. As the operation changing switch 9 is "off", i.e., selecting the "sole-action" [ST2], the mode changing switch 8 is "off", i.e., selecting the "mode of each axis manual operation" [ST51], and the robot changing switch 7 is "off", i.e., being designated "tool handling robot" [ST52 in FIG. 17], the procedure is led to step 53.

[a-1]; Velocities for the joints of tool handling robot 2 are calculated as follows;

The velocities $V1_t, V2_t, V3_t, V4_t, V5_t, V6_t$ are computed by use of actuating signals S1, S2, S3, S4, S5, S6 generated by the keys, a designated rate "$r_b$" and maximum values $V1_{t0}, V2_{t0}, V3_{t0}, V4_{t0}, V5_{t0}, V6_{t0}$ memorized in a velocity table for "each axis manual operation" of tool handling robot 2 [ST53], from equations (32).

$$\begin{aligned} V1_t &= S1 \times r_b \times V1_{t0} \\ V2_t &= S2 \times r_b \times V2_{t0} \\ V3_t &= S3 \times r_b \times V3_{t0} \\ V4_t &= S4 \times r_b \times V4_{t0} \\ V5_t &= S5 \times r_b \times V5_{t0} \\ V6_t &= S6 \times r_b \times V6_{t0} \end{aligned} \quad (32)$$

The above-mentioned S1, S2, ..., S6 are as follows;

pressing each of the keys $12a \sim 12f$ produces a signal "+1" respectively, pressing each of the keys $12A \sim 12F$ produces a signal "−1" respectively, releasing each of the keys $12a \sim 12f$, $12A \sim 12F$ produces a signal "0" respectively.

Since keys 12a and 12c only are pressed in this example, similar to the above-mentioned example, $$V2_t = 0, V4_t = 0, V5_t = 0, V6_t = 0.$$

[a−2]; "Joint variables" $\theta_{1-0}, \theta_{2-0}, \ldots, \theta_{6-0}$ of tool handling robot 2 at the starting time of the manual teaching operations are inputted [ST54].

[a-3]; Setting up i.e., i=0, and a lapse of time $\Delta t_{-i}$ from the starting time of manual operations is set up to equal "0" [ST55].

Figure 18:
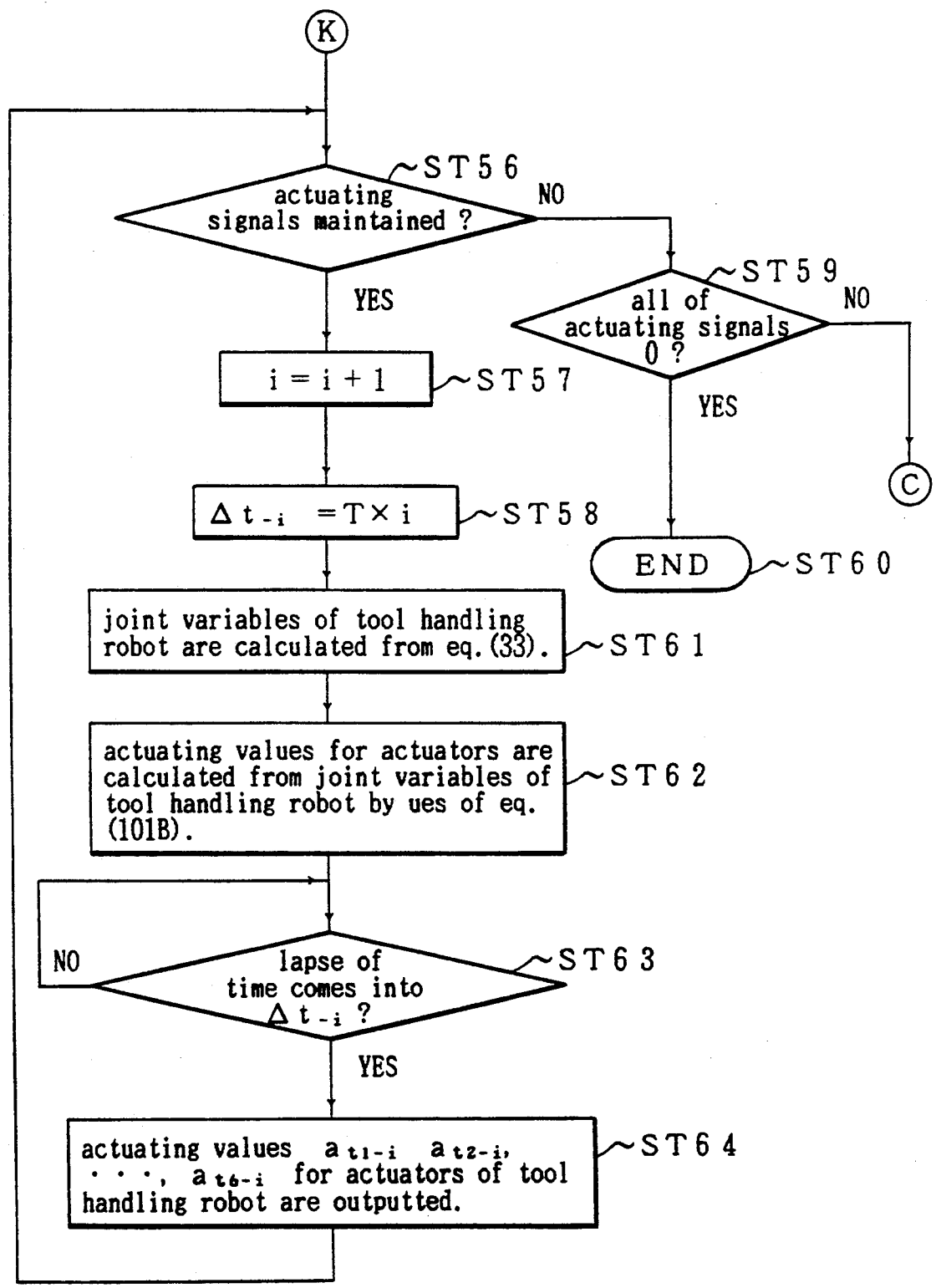
FIG. 18 is a flow chart which explains the "mode of sole-acting each axis of the manual operation" continued from K of FIG. 17.

[b]: The second process is as follows;

The discrimination of whether keys 12a and 12c previously pressed have been released or not, i.e., whether actuating signals are maintained or not, is carried out [ST56 in FIG. 18]. If all of the actuating signals are maintained, a infinitesimal time of $\Delta T$ is added to the lapse of time $\Delta t_{-i}$ [ST57, ST58], and carrying out the third process is commanded after the lapse of time is replaced with $\Delta T_{-i+1}$. If all of the keys 12a and 12c have been already released [ST59], the teaching operation is terminated [ST60]. If the keys have been pressed are different from previous ones, i.e., the keys 12a and 12D have been already pressed instead of keys 12a and 12c [ST59], the procedure is repeated from step 1 by use of new actuating signals thereof.

[c]: The third process is as follows; This is carrying out by receiving the command from the second process.

"Joint variables" $\theta_{1-i}, \theta_{2-i}, \ldots, \theta_{6-i}$ of tool handling robot 2 after the lapse of time $\Delta t_{-i}$, i.e., after $\Delta T \times i$, are calculated [ST61].

$$\theta_{1-i} = \theta_{1-o} + V1_t \times \Delta t_{-i} \quad (33)$$
$$\theta_{2-i} = \theta_{2-o} + V2_t \times \Delta t_{-i}$$
$$\theta_{3-i} = \theta_{3-o} + V3_t \times \Delta t_{-i}$$
$$\theta_{4-i} = \theta_{4-o} + V4_t \times \Delta t_{-i}$$
$$\theta_{5-i} = \theta_{5-o} + V5_t \times \Delta t_{-i}$$
$$\theta_{6-i} = \theta_{6-o} + V6_t \times \Delta t_{-i}$$

Such "joint variables" $\theta_{1-i}, \theta_{2-i}, \ldots, \theta_{6-i}$ of tool handling robot 2 are transformed into actuating values $a_{t1-i}, a_{t2-i}, \ldots, a_{t6-i}$ for actuators thereof by use of the following equations (101B) [ST62], which are outputted just after the lapse of time comes into $\Delta t_{-i}$ [ST63, ST64], and the procedure is returned to the second process.

$$a_{t1-i} = \theta_{1-i}/R_{t1} \quad (101B)$$
$$a_{t2-i} = \theta_{2-i}/R_{t2}$$
$$a_{t3-i} = \theta_{3-i}/R_{t3}$$
$$a_{t4-i} = \theta_{4-i}/R_{t4}$$
$$a_{t5-i} = \theta_{5-i}/R_{t5}$$
$$a_{t6-i} = \theta_{6-i}/R_{t6}$$

This equation (101B) is the same with equation (101) mentioned above.

[2] The operation of changing the position and attitude of workpiece $1m$ into the desired position and attitude thereof by means of actuating the joints of workpiece handling robot 1 is as follows. This procedure is the same with that of changing position and attitude of tool $2n$ into the desired position and attitude thereof by means of actuating the joints of tool handling robot 2, which has been described in section [1].

An operator chooses the "workpiece handling robot" in the robot changing switch 7, "mode of each axis manual operation" in the mode changing switch 8 and "sole-action" in the operation changing switch 9 on teach pendant 3. Moreover, a desired rate "r", e.g., 0.5, which is indicated as "$r_c$" is chosen in the rate changing switch 10.

An operator presses the desired keys, e.g., 12A and 12d. The procedure until they are released are as follows;

[a]: The first process consists of the following [a-1] to [a-3].

The actuating signals are picked up to the control equipment by means of pressing the keys 12A and 12d [ST1 in FIG. 7]. As the operation changing switch 9 is "off", i.e., selecting "sole-action" [ST2], the mode changing switch 8 is "off", i.e., selecting the "mode of each axis manual operation"[ST51], and the robot changing switch 7 is "on", i.e., being designated "workpiece handling robot" [ST52 in FIG. 17], the procedure is led to step 65.

[a-1]; Velocities for the joints of workpiece handling robot 1 are calculated as follows;

The velocities $V1_w, V2_w, V3_w, V4_w, V5_w, V6_w$ are computed by use of actuating signals S1, S2, S3, S4, S5, S6 generated by the keys, a designated rate "$r_c$" and maximum values $V1_{w0}, V2_{w0}, V3_{w0}, V4_{w0}, V5_{w0}, V6_{w0}$ memorized in a velocity table for "each axis manual operation" of workpiece handling robot 1 [ST65], from equation (23C) which is the same with the above-mentioned equation (23).

$$V1_w = S1 \times r_c \times V1_{w0} \quad (23C)$$
$$V2_w = S2 \times r_c \times V2_{w0}$$
$$V3_w = S3 \times r_c \times V3_{w0}$$
$$V4_w = S4 \times r_c \times V4_{w0}$$
$$V5_w = S5 \times r_c \times V5_{w0}$$

-continued
$$V6_w = S6 \times r_c \times V6_{w0}$$

The above-mentioned S1, S2, ..., S6 are as follows;
pressing each of the keys $12a \sim 12f$ produces a signal "+1" respectively,
pressing each of the keys 12A $\sim$ 12F produces a signal "−1" respectively,
releasing each of the keys $12a \sim 12f$, 12A $\sim$ 12F produces a signal "0" respectively.
Since keys 12A and 12d only are pressed in this example, similar to the above-mentioned example, $$V2_w=0, V3_w=0, V5_w=0, V6_w=0.$$

[a-2]; "Joint variables" $\phi_{1-0}, \phi_{2-0}, \ldots, \phi_{6-0}$ of workpiece handling robot 1 at the starting time of manual teaching operations are inputted [ST66].

[a-3]; i is set to "0", and a lapse of time $\Delta t_{-i}$ from the starting time of manual operations is set up to equal "0" [ST67].

Figure 19:
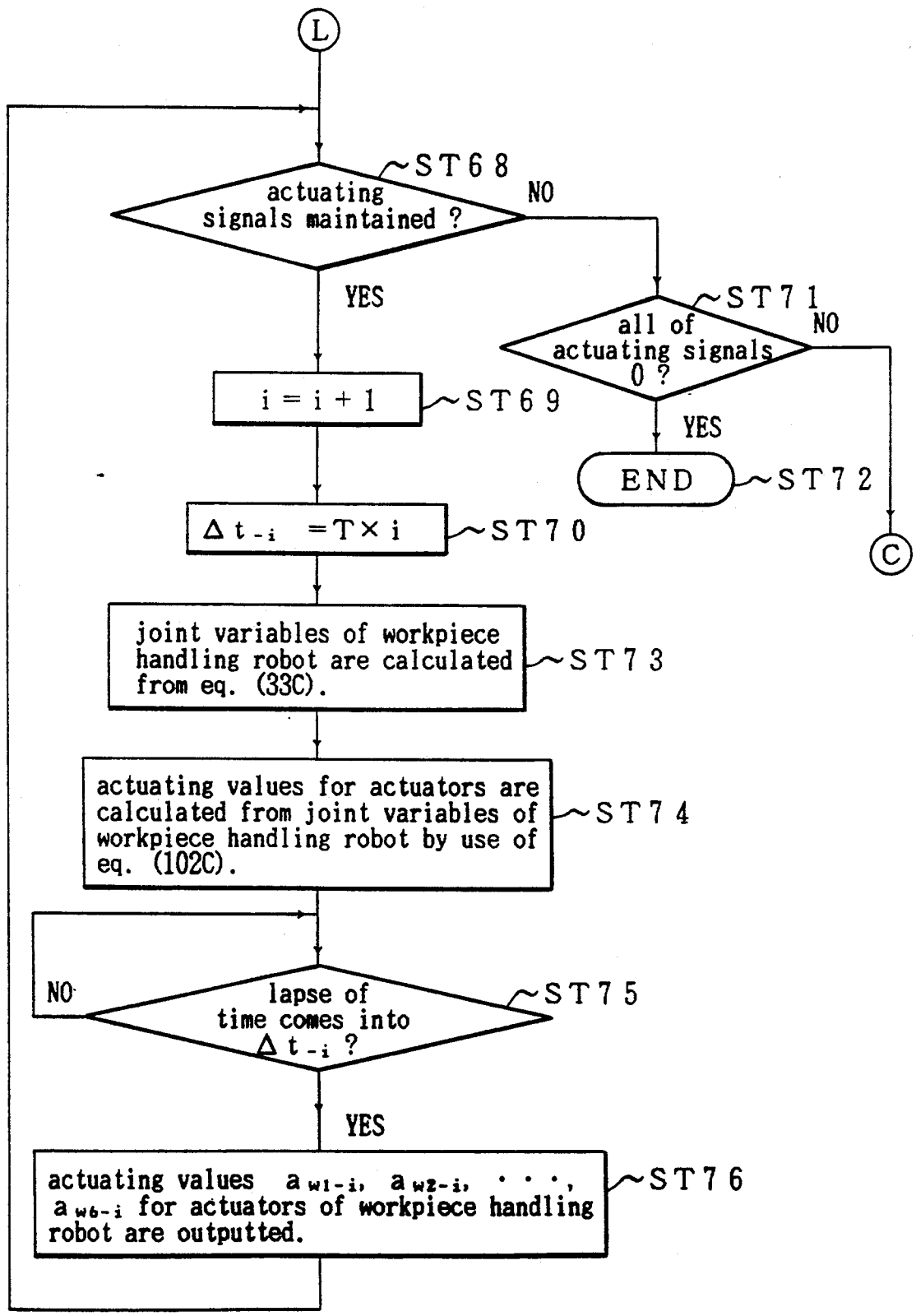
FIG. 19 is a flow chart which explains the "mode of sole-acting each axis of the manual operation" continued from L of FIG. 17.

[b]: The second process is as follows;

The discrimination of whether keys 12A and 12d previously pressed have been released or not, i.e., whether the actuating signals are maintained or not, is carried out [ST68 in FIG. 19]. If all actuating signals are maintained, a infinitesimal time of $\Delta T$ is added to the lapse of time $\Delta t_{-i}$ [ST69, ST70], and carrying out the third process is commanded after the lapse of time is replaced with $\Delta t_{-i+1}$. If all keys 12A and 12d have been already released [ST71], the teaching operation is terminated [ST72]. If the keys have been pressed are different from previous ones, i.e., the keys 12a and 12d have been already pressed instead of the keys 12A and 12d [ST71], the procedure is repeated from step 1 by use of the new actuating signals thereof.

[c]: The third process is as follows; This is carried out by receiving the command from the second process.

"Joint variables" $\phi_{1-i}, \phi_{2-i}, \ldots, \phi_{6-i}$ of workpiece handling robot 1 after the lapse of time $\Delta t_{-i}$, i.e., after $\Delta T \times i$, are calculated [ST73].

$$\phi_{1-i} = \phi_{1-o} + V1_t \times \Delta t_{-i} \quad (33C)$$
$$\phi_{2-i} = \phi_{2-o} + V2_t \times \Delta t_{-i}$$
$$\phi_{3-i} = \phi_{3-o} + V3_t \times \Delta t_{-i}$$
$$\phi_{4-i} = \phi_{4-o} + V4_t \times \Delta t_{-i}$$
$$\phi_{5-i} = \phi_{5-o} + V5_t \times \Delta t_{-i}$$
$$\phi_{6-i} = \phi_{6-o} + V6_t \times \Delta t_{-i}$$

This equation (33C) is the same with equation (33) mentioned above.

Such "joint variables" $\phi_{1-i}, \phi_{2-i}, \ldots, \phi_{6-i}$ of workpiece handling robot 1 are transformed into actuating values $a_{w1-i}, a_{w2-i}, \ldots, a_{w6-i}$ for the actuators thereof by the use of following equations (102C) [ST74], which are outputted just after the lapse of time comes into $\Delta t_{-i}$ [ST75, ST76], and the procedure is returned to the second process.

$$a_{w1-i} = \phi_{1-i}/R_{w1} \quad (102C)$$
$$a_{w2-i} = \phi_{2-i}/R_{w2}$$
$$a_{w3-i} = \phi_{3-i}/R_{w3}$$
$$a_{w4-i} = \phi_{4-i}/R_{w4}$$
$$a_{w5-i} = \phi_{5-i}/R_{w5}$$
$$a_{w6-i} = \phi_{6-i}/R_{w6}$$

This equation (102C) is the same with equation (102) mentioned above.

Next, "sole-acting cartesian coordinates manual operation" is described below:

[3] The operation of the changing position and attitude of tool $2n$ into the desired position and attitude thereof with respect to the world coordinates system 51 by means of actuating the joints of tool handling robot 2 is as follows;

An operator chooses "tool handling robot" in the robot changing switch 7, "mode of cartesian coordinates manual operation" in the mode changing switch 8 and "sole-action" in the operation changing switch 9 on teach pendant 3. Moreover, a desired rate "r", e.g., 0.2, which is indicated as "$r_b$" is chosen in the rate changing switch 10.

An operator presses the desired keys, e.g., 12b and 12c. The procedure until they are released are as follows;

[a]: The first process consists of the following ]a−1] to [a-3].

Figure 20:
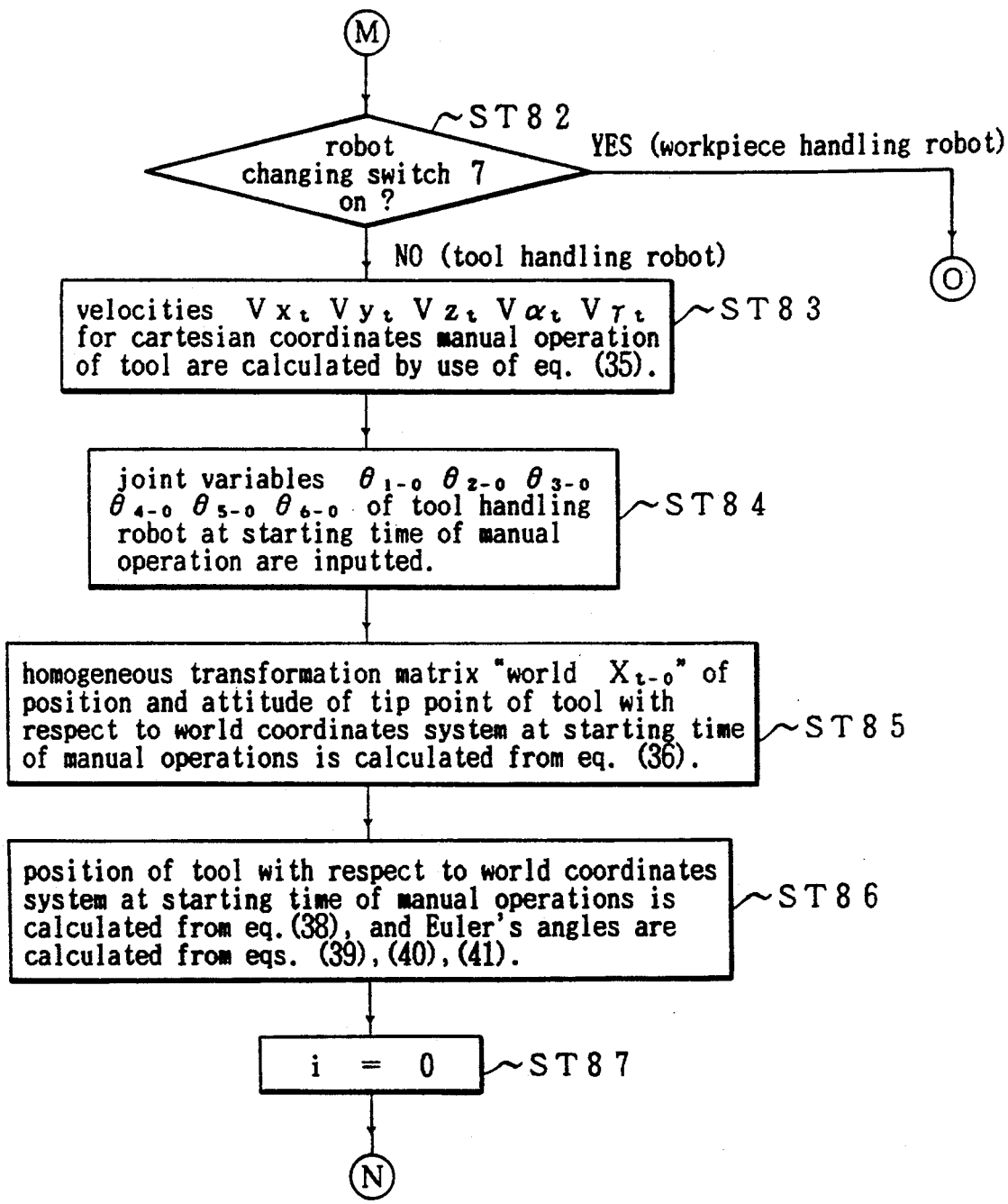
FIG. 20 is a flow chart which explains the "mode of sole-acting the cartesian coordinates of the manual operation" continued from M of FIG. 7.

Actuating signals are inputted to the control equipment by means of pressing the keys 12b and 12c [ST1 in FIG. 7]. As the operation changing switch 9 is "off", i.e., being selected "sole-action" [ST2], the mode changing switch 8 is "on", i.e., being selected "mode of cartesian coordinates manual operation" [ST51], and the robot changing switch 7 is "off", i.e., being designated "tool handling robot" [ST82 in FIG. 20], the procedure is led to step 83.

[a−1]; Velocities for translation and rotation of tool $2n$ in the world coordinates system 51 are calculated as follows;

The velocities $Vx_t, Vy_t, Vz_t, V\alpha_t, V\beta_t, V\gamma_t$ are computed by the use of actuating signals $Sx, Sy, Sz, S\alpha, S\beta, S\gamma$ generated by the keys, a designated rate "$r_b$" and the maximum values $Vx_{t0}, Vy_{t0}, Vz_{t0}, V\alpha_{t0}, V\beta_{t0}, V\gamma_{t0}$ memorized in a velocity table for "cartesian coordinates manual operation" of tool $2n$ [ST83], from equations (35).

$$\begin{aligned}
Vx_t &= Sx \times r_b \times Vx_{t0} \\
Vy_t &= Sy \times r_b \times Vy_{t0} \\
Vz_t &= Sz \times r_b \times Vz_{t0} \\
V\alpha_t &= S\alpha \times r_b \times V\alpha_{t0} \\
V\beta_t &= S\beta \times r_b \times V\beta_{t0} \\
V\gamma_t &= S\gamma \times r_b \times V\gamma_{t0}
\end{aligned} \quad (35)$$

The above-mentioned $Sx, Sy, \ldots, S\gamma$ are as follows;

pressing each of the keys $12a \sim 12f$ produces a signal "+1" for each output;

pressing each of the keys $12A \sim 12F$ produces a signal "−1" for each output;

releasing each of the keys $12a \sim 12f$, $12A \sim 12F$ produces a signal "0" for each output.

Since the key 12b and 12c only are pressed in this example, similar to the above-mentioned example, $Vx_t=0, V\alpha_t=0, V\beta_t=0, V\gamma_t=0$.

[a-2]; "Joint variables" $\theta_{1-0}, \theta_{2-0}, \ldots, \theta_{6-0}$ of tool handling robot 2 at the starting time of the manual teaching operations are inputted [ST84]. And a homogeneous transformation matrix "world $X_{t-o}$" of position and attitude of the tip point 57 of tool $2n$ with respect to the world coordinates system 51 is calculated as a following equation [ST85].

$$\text{world } X_{t-o} = Z_r T_{2-0} \cdot E_t \quad (36)$$

Equation (36) is formulated as a following equation.

$$\text{world } X_{t-o} = \begin{bmatrix} n_x & o_x & a_x & p_x \\ n_y & o_y & a_y & p_y \\ n_z & o_z & a_z & p_z \\ 0 & 0 & 0 & 1 \end{bmatrix} \quad (37)$$

By transforming the above equations, the data for position $X_{t-o}, Y_{t-o}, Z_{t-o}$ and the data of Euler's angles $\alpha_{t-o}, \beta_{t-o}, \gamma_{t-o}$ for the attitude of the tip point 57 of tool $2n$ with respect to the world coordinates system 51 at the starting time of manual operations are obtained. The 6 equivalent parameters are calculated by the following equations.

$$\text{world } X_{t-o} = \text{Trans}(X_{t-o}, Y_{t-o}, Z_{t-o}) \cdot \text{Rot}(Z, \alpha_{t-o}) \cdot$$

$$\text{Rot}(Y, \beta_{t-o}) \cdot \text{Rot}(Z, \gamma_{t-o}) =$$

$$\begin{bmatrix}
\cos(\alpha_{t-o})\cos(\beta_{t-o})\cos(\gamma_{t-o}) - \sin(\alpha_{t-o})\sin(\gamma_{t-o}) \\
\sin(\alpha_{t-o})\cos(\beta_{t-o})\cos(\gamma_{t-o}) + \cos(\alpha_{t-o})\sin(\gamma_{t-o}) \\
-\sin(\beta_{t-o})\cos(\gamma_{t-o}) \\
0
\end{bmatrix}$$

$$\begin{matrix}
-\cos(\alpha_{t-o})\cos(\beta_{t-o})\sin(\gamma_{t-o}) - \sin(\alpha_{t-o})\cos(\gamma_{t-o}) \\
-\sin(\alpha_{t-o})\cos(\beta_{t-o})\sin(\gamma_{t-o}) - \cos(\alpha_{t-o})\cos(\gamma_{t-o}) \\
\sin(\beta_{t-o})\cos(\gamma_{t-o}) \\
0
\end{matrix}$$

$$\begin{matrix}
\cos(\alpha_{t-o})\sin(\beta_{t-o}) & X_{t-o} \\
\sin(\alpha_{t-o})\sin(\beta_{t-o}) & Y_{t-o} \\
\cos(\beta_{t-o}) & Z_{t-o} \\
0 & 1
\end{matrix}$$

$$X_{t-o} = p_x, Y_{t-o} = p_y, Z_{t-o} = p_z \quad (38)$$
$$\alpha_{t-o} = \cos^{-1}(a_x/\sin(\beta_{t-o})) \quad (39)$$
$$\beta_{t-o} = \cos^{-1}(a_z) \quad (40)$$
$$\gamma_{t-o} = \sin^{-1}(o_z/\sin(\beta_{t-o})) \quad (41)$$

By the use of these equations (38), (39), (40) and (41), the position and attitude of tool $2n$ are calculated [ST86].

[a-3]; i is set to "0", and a lapse of time $\Delta t_{-i}$ from the starting time of manual operations is set up equal to "0" [ST87].

Figure 21:
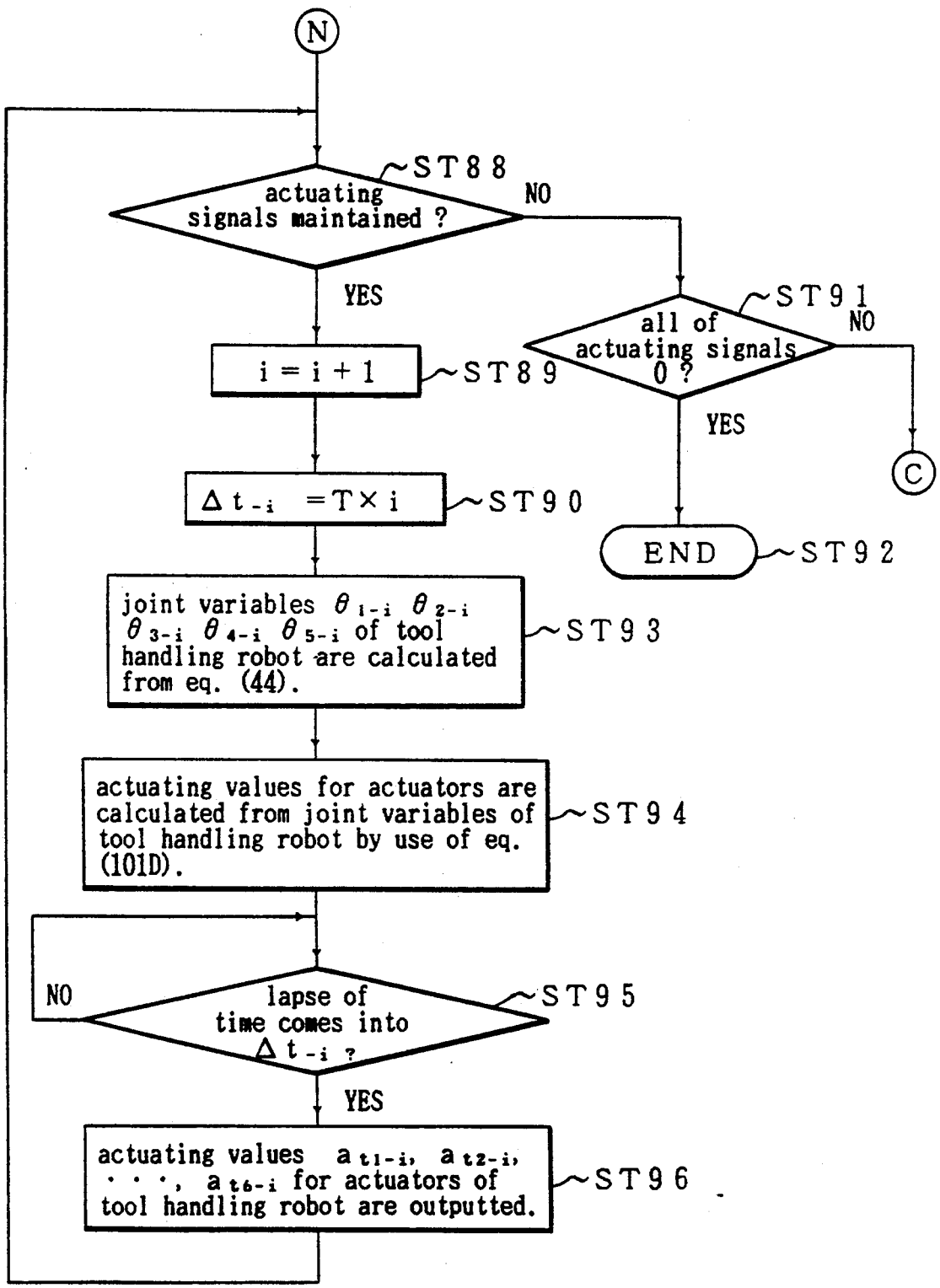
FIG. 21 is a flow chart which explains the "mode of sole-acting the cartesian coordinates of the manual operation" continued from N of FIG. 20.
Figure 22:
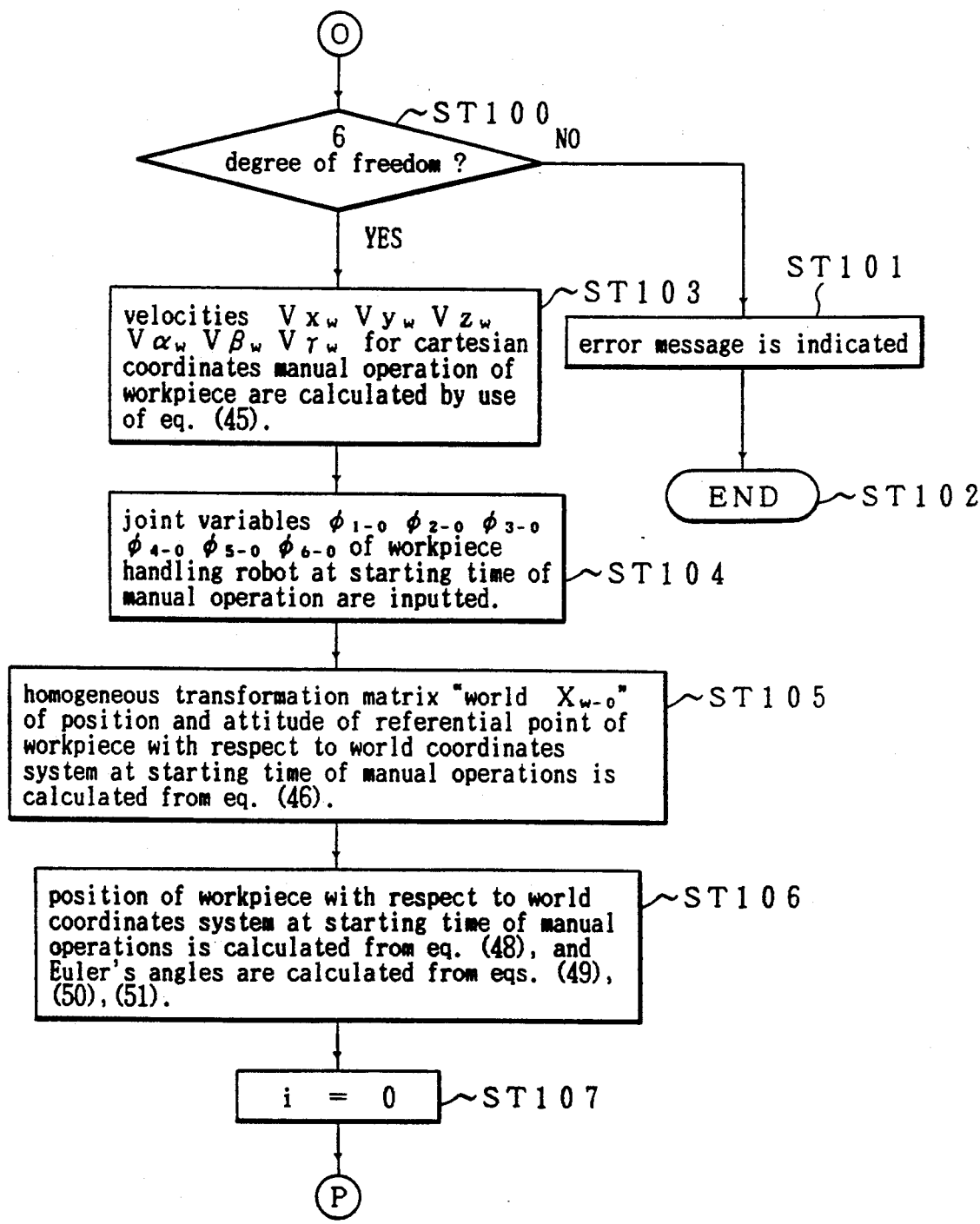
FIG. 22 is a flow chart which explains the "mode of sole-acting the cartesian coordinates of the manual operation" continued from O of FIG. 20.

[b]: The second process is as follows;

The discrimination of whether the keys 12b and 12c previously pressed have been released or not, i.e., whether the actuating signals are maintained or not, is carried out [ST88 in FIG. 21]. If all actuating signals are maintained, an infinitesimal time $\Delta T$ is added to the lapse of time $\Delta t_{-i}$ [ST89, ST90], and carrying out the third process is commanded after the lapse of time is replaced with $\Delta t_{-i+1}$. If all of the keys 12b and 12c have been already released [ST91], the teaching operation is terminated [ST92]. If the keys pressed are different from previous ones, i.e., the keys 12C and 12F have been already pressed instead of the keys 12b and 12c [ST91], the procedure is repeated from step 1 by the use of the new actuating signals thereof.

[c]: The third process is as follows; This is carrying out by receiving the command from the second process.

Position $X_{t-i}, Y_{t-i}, Z_{t-i}$ and Euler's angle $\alpha_{t-i}, \beta_{t-i}, \gamma_{t-i}$ of the attitude of the tip point 57 of tool $2n$ with respect to the world coordinates system 51 after the lapse of time $\Delta t_{-1}$, i.e., after $\Delta T \times i$, are calculated.

$$X_{t-i} = X_{t-o} + Vx_t \times \Delta t_{-i} \quad (42)$$
$$Y_{t-i} = Y_{t-o} + Vy_t \times \Delta t_{-i}$$
$$Z_{t-i} = Z_{t-o} + Vz_t \times \Delta t_{-i}$$
$$\alpha_{t-i} = \alpha_{t-o} + V\alpha_t \times \Delta t_{-i}$$
$$\beta_{t-i} = \beta_{t-o} + V\beta_t \times \Delta t_{-i}$$
$$\gamma_{t-i} = \gamma_{t-o} + V\gamma_t \times \Delta t_{-i}$$

A homogeneous transformation matrix "world $X_{t-i}$" of the position and attitude of the tip point 57 of tool is calculated as a following equation.

$$\text{world } X_{t-i} = \text{Trans}(X_{t-i}, Y_{t-i}, Z_{t-i}) \cdot \text{Rot}(Z, \alpha_{t-i}) \cdot \text{Rot}(Y, \beta_{t-i}) \cdot \text{Rot}(Z, \gamma_{t-i}) \quad (43).$$

Since position and attitude $T_{2-i}$ of tool handling robot 2 is expressed as a following equation (44) similar to above-mentioned equation (20), "point variables" $\theta_{1-i}, \theta_{2-i}, \ldots, \theta_{6-i}$ of tool handling robot 2 are obtained [ST93].

$$T_{2-i} = (Z_t)^{-1} \cdot \text{world } X_{w-i} \cdot X_t(E_t)^{-1} \quad (44)$$

Such "joint variables" $\theta_{1-i}, \theta_{2-i}, \ldots, \theta_{6-i}$ of tool handling robot 2 are transformed into actuating values $a_{t1-i}, a_{t2-i}, \ldots, a_{t6-i}$ for actuators thereof by use of the following equations (101D) [ST94], which are outputted just after the lapse of time comes into $\Delta t_{-i}$ [ST95, ST96], and the procedure is returned to the second process.

$$a_{t1-i} = \theta_{1-i}/R_{t1} \quad (101D)$$
$$a_{t2-i} = \theta_{2-i}/R_{t2}$$
$$a_{t3-i} = \theta_{3-i}/R_{t3}$$
$$a_{t4-i} = \theta_{4-i}/R_{t4}$$
$$a_{t5-i} = \theta_{5-i}/R_{t5}$$
$$a_{t6-i} = \theta_{6-i}/R_{t6}$$

This equation (101D) is the same with equation (101) mentioned above.

[4] The operation of changing the position and attitude of workpiece 1m into desired position and attitude thereof with respect to the world coordinates system 51 by means of actuating the joints of workpiece handling robot 1 is as follows;

An operator chooses the "workpiece handling robot" in the robot changing switch 7, "mode of cartesian coordinates manual operation" in the mode changing switch 8 and "sole-action" in the operation changing switch 9 on teach pendant 3. This means "sole-acting cartesian coordinates manual operation of workpiece handling robot". Moreover, a desired rate "r", e.g., 0.5, which is indicated as "$r_c$" is chosen in the rate changing switch 10.

An operator presses the desired keys, e.g., 12a and 12c. The procedure until they are released, are as follows;

[a]: The first process consists of the following [a-1] to [a-3].

Actuating signals are taken into the control equipment by means of pressing the keys 12a and 12c [ST1 in FIG. 7]. As the operation changing switch 9 is "off", i.e., being selected "sole-action" [ST2], the mode changing switch 8 is "on", i.e., being selected "mode of cartesian coordinates manual operation" [ST51], and the robot changing switch 7 is "on", i.e., being designated "workpiece handling robot" [ST82 in FIG. 20], the procedure is led to step 100 in FIG. 20.

A workpiece handling robot 1 may be a manipulator of 6 degrees of freedom or a positioner of less than 3 degrees of freedom. A manipulator of 6 degrees of freedom only is, however, applied to the control in this embodiment of the present invention, therefore, in step 100 it is discriminated whether workpiece handling robot 1 is a manipulator of 6 degrees of freedom or not.

As the degree of freedom of workpiece handling robot 1 is previously stored in the "control means for manual teaching operations" 4A, the discrimination of whether workpiece handling robot 1 is 6 degrees of freedom is carried out by means of the stored signal. If workpiece handling robot 1 is a positioner, a message that the procedure for controlling later is impossible is indicated in an undrawn CRT etc. [ST101], the procedure is terminated at that time [ST102]. If workpiece handling robot 1 is 6 degrees of freedom [ST100], the procedure is led to step 103.

[a-1]; Velocities for the translation and rotation of workpiece 1m in the world coordinates system 51 are calculated as follows;

The velocities $Vx_w, Vy_w, Vz_w, V\alpha_w, V\beta_w, V\gamma_w$ are computed by the use of actuating signals $Sx, Sy, Sz, S\alpha, S\beta, S\gamma$ generated by the keys, a designated rate "$r_c$" and the maximum values $Vx_{w0}, Vy_{w0}, Vz_{w0}, V\alpha_{w0}, V\beta_{w0}, V\gamma_{w0}$ memorized in a velocity table for "cartesian coordinates manual operation" of workpiece 1m [ST103], from equations (45).

$$Vx_w = Sx \times r_c \times Vx_{w0} \quad (45)$$
$$Vy_w = Sy \times r_c \times Vy_{w0}$$
$$Vz_w = Sz \times r_c \times Vz_{w0}$$
$$V\alpha_w = S\alpha \times r_c \times V\alpha_{w0}$$
$$V\beta_w = S\beta \times r_c \times V\beta_{w0}$$
$$V\gamma_w = S\gamma \times r_c \times V\gamma_{w0}$$

The above-mentioned $Sx, Sy, \ldots, S\gamma$ are as follows;
pressing each of the keys 12a ~ 12f produces a signal "+1" for each output;
pressing each of the keys 12A ~ 12F produces a signal "−1" for each output;
releasing each of the keys 12a ~ 12f, 12A ~ 12F produces a signal "0" for each output.

Since the keys 12a and 12c only are pressed in this example, similar to the above-mentioned example, $$Vy_w = 0, V\alpha_w = 0, V\beta_w = 0, V\gamma_w = 0.$$

[a-2]; "Joint variables" $\phi_{1-0}, \phi_{2-0}, \ldots, \phi_{6-0}$ of workpiece handling robot 1 at the starting time of manual teaching operations are inputted [ST104]. And a homogeneous transformation matrix "world $X_{w-o}$" of the position and attitude of the referential point 56 of workpiece 1m with respect to the world coordinates system 51 is calculated as a following equation [ST105].

$$\text{world } X_{w-o} = Z_w \cdot T_{2-0} \cdot E_w \quad (46).$$

Equation (46) is formulated as a following equation.

$$\text{world } X_{w-o} = \begin{bmatrix} n_x & o_x & a_x & p_x \\ n_y & o_y & a_y & p_y \\ n_z & o_z & a_z & p_z \\ 0 & 0 & 0 & 1 \end{bmatrix} \quad (47)$$

By transforming the above equations, the data for position $X_{w-o}, Y_{w-o}, Z_{w-o}$ and the data of Euler's angles $\alpha_{w-o}, \beta_{w-o}, \gamma_{w-o}$ for attitude of the tip referential point 56 of workpiece 1m with respect to the world coordinates system 51 at the starting time of manual operations are obtained. The 6 equivalent parameters are calculated by the following equations.

world $X_{w-o} = \text{Trans}(X_{w-o}, Y_{w-o}, Z_{w-o}) \cdot \text{Rot}(Z, \alpha_{w-o}) \cdot$ $\text{Rot}(Y, \beta_{w-o}) \cdot \text{Rot}(Z, \gamma_{w-o}) =$ $$\begin{bmatrix} \cos(\alpha_{w-o})\cos(\beta_{w-o})\cos(\gamma_{w-o}) - \sin(\alpha_{w-o})\sin(\gamma_{w-o}) \\ \sin(\alpha_{w-o})\cos(\beta_{w-o})\cos(\gamma_{w-o}) + \cos(\alpha_{w-o})\sin(\gamma_{w-o}) \\ -\sin(\beta_{w-o})\cos(\gamma_{w-o}) \\ 0 \end{bmatrix}$$

$-\cos(\alpha_{w-o})\cos(\beta_{w-o})\sin(\gamma_{w-o}) - \sin(\alpha_{w-o})\cos(\gamma_{w-o})$
$-\sin(\alpha_{w-o})\cos(\beta_{w-o})\sin(\gamma_{w-o}) - \cos(\alpha_{w-o})\cos(\gamma_{w-o})$
$\sin(\beta_{w-o})\cos(\gamma_{w-o})$
$0$ $$\begin{bmatrix} \cos(\alpha_{w-o})\sin(\beta_{w-o}) & X_{w-o} \\ \sin(\alpha_{w-o})\sin(\beta_{w-o}) & Y_{w-o} \\ \cos(\beta_{w-o}) & Z_{w-o} \\ 0 & 1 \end{bmatrix}$$

$X_{w-o} = p_x, Y_{w-o} = p_y, Z_{w-o} = p_z$ (48)
$\alpha_{w-o} = \cos^{-1}(a_x/\sin(\beta_{w-o}))$ (49)
$\beta_{w-o} = \cos^{-1}(a_z)$ (50)
$\gamma_{w-o} = \sin^{-1}(o_z/\sin(\beta_{w-o}))$ (51)

By using these equations (48), (49), (50) and (51), the position and attitude of workpiece $1m$ are calculated [ST106].

[a-3]; Setting up i=0, and a lapse of time $\Delta t_{-i}$ from the starting time of manual operations is set up equal to "0" [ST107].

Figure 23:
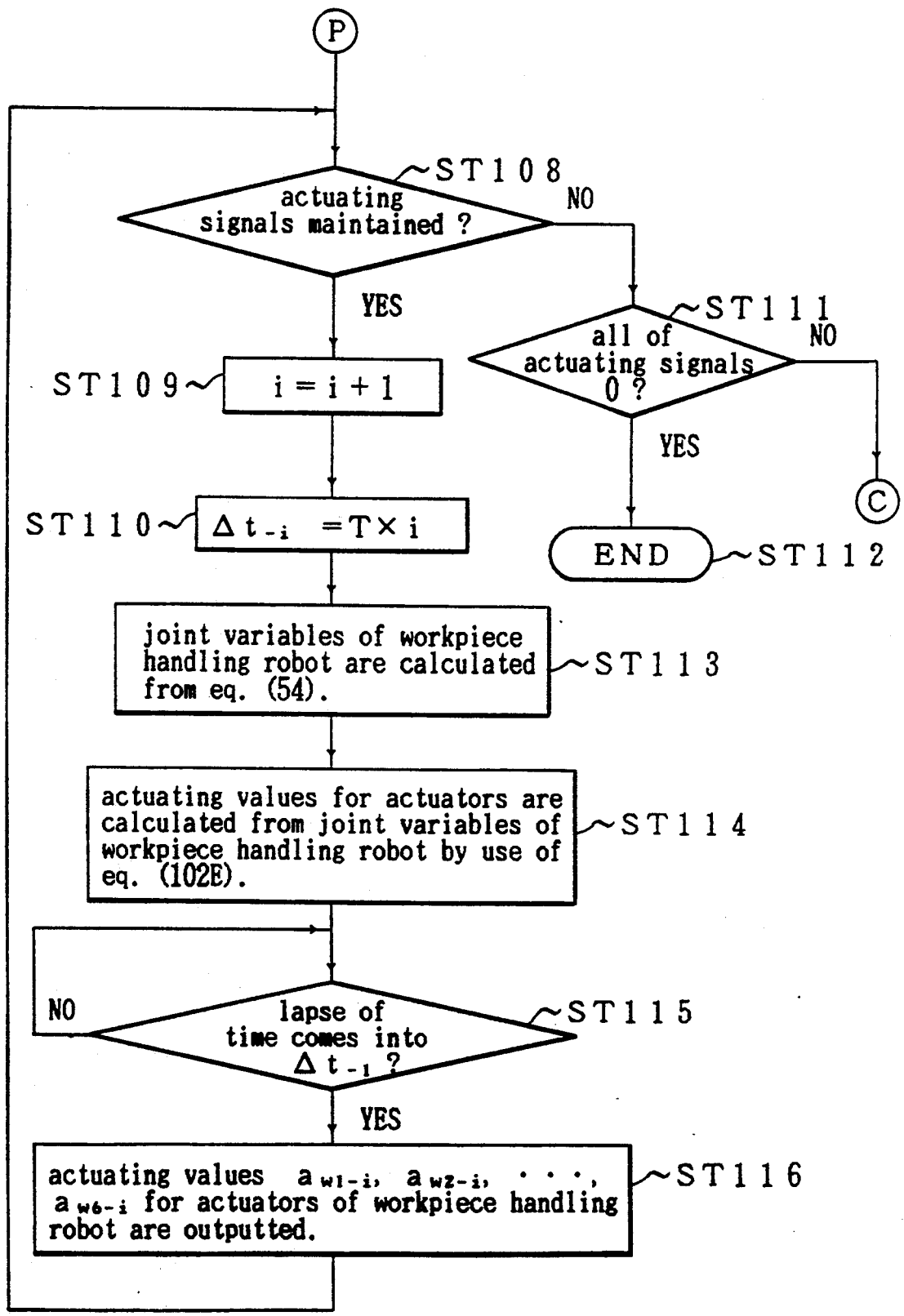
FIG. 23 is a flow chart which explains the "mode of sole-acting the cartesian coordinates of the manual operation" continued from P of FIG. 22.
Figure 24A:
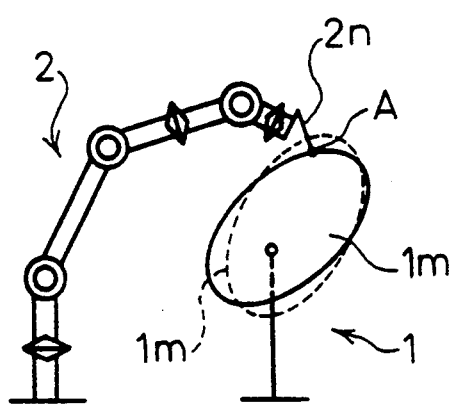
FIG. 24 is schematic drawings for explanations of the cooperation in the prior art which does not associate the workpiece handling robot with the tool handling robot, i.e., of "sole-action", where (a) shows a state at the first position, (b) shows a state that the tool is retired from the workpiece, (c) shows a state that the workpiece is being moved to a next teaching point, and (d) shows a state that the tool is taught a next point on the workpiece.
Figure 24B:
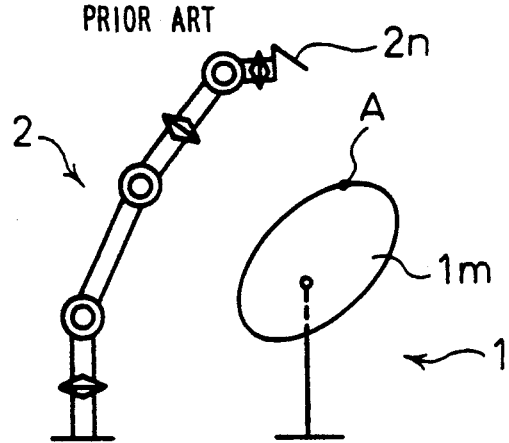
Figure 24C:
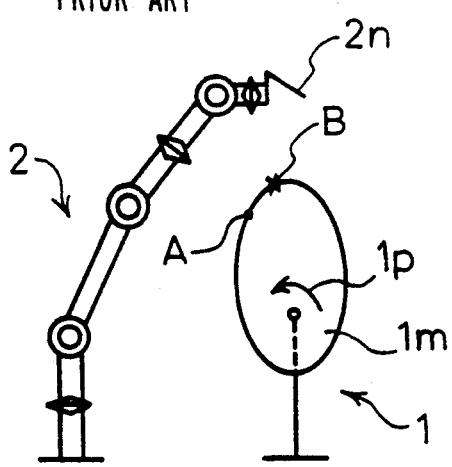
Figure 24D:
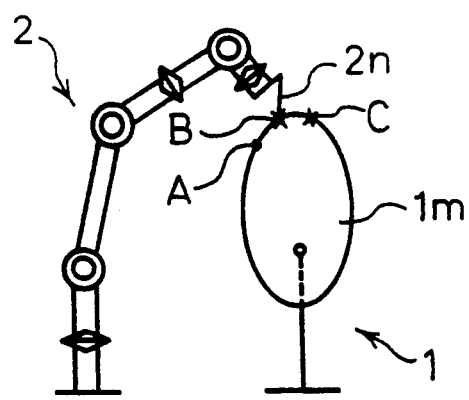

[b]: The second process is as follows;

The discrimination of whether the keys 12a and 12c previously pressed have been released or not, i.e., whether the actuating signals are maintained or not, is carried out [ST108 in FIG. 23]. If all of actuating signals are maintained, an infinitesimal time $\Delta T$ is added to the lapse of time $\Delta t_{-i}$ [ST109, ST110], and carrying out the third process is commanded after the lapse of time is replaced with $\Delta t_{-i+1}$. If all of the keys 12a and 12c have been already released [ST111], the teaching operation is terminated [ST112]. If the keys have been pressed are different from previous ones, i.e., the keys 12a, 12c and 12E have been already pressed instead of the keys 12a and 12c [ST111], the procedure is repeated from step 1 by using the new actuating signals thereof.

[c]: The third process is as follows; This is carrying out by receiving the command from the second process.

Position $X_{w-i}, Y_{w-i}, Z_{w-i}$ and Euler's angle $\alpha_{w-i}, \beta_{w-i}, \gamma_{w-i}$ of the attitude of the referential point 56 of workpiece $1m$ with respect to the world coordinates system 51 after the lapse of time $\Delta t_{-1}$, i.e., after $\Delta T \times i$, are calculated.

$X_{w-i} = X_{w-o} + Vx_w \times \Delta t_{-i}$ (52)
$Y_{w-i} = Y_{w-o} + Vy_w \times \Delta t_{-i}$
$Z_{w-i} = Z_{w-o} + Vz_w \times \Delta t_{-i}$
$\alpha_{w-i} = \alpha_{w-o} + V\alpha_w \times \Delta t_{-i}$
$\beta_{w-i} = \beta_{w-o} + V\beta_w \times \Delta t_{-i}$
$\gamma_{w-i} = \gamma_{w-o} + V\gamma_w \times \Delta t_{-i}$ A homogeneous transformation matrix "world $X_{t--i}$" of the position and attitude of the referential point 56 of workpiece is calculated as a following equation.

world $X_{w-i} = \text{Trans}(X_{w-i}, Y_{w-i}, Z_{w-i}) \cdot \text{Rot}(Z, \alpha_{w-i}) \cdot \text{Rot}(Y, \beta_{w-i}) \cdot \text{Rot}(Z, \gamma_{w-i})$ (53).

Since position and attitude $W_{2-i}$ of workpiece handling robot 1 is expressed as a following equation (54) similar to above-mentioned equation (22), "joint variables" $\phi_{1-i}, \phi_{2-i}, \ldots, \phi_{6-i}$ of workpiece handling robot 1 are obtained [ST113].

$W_{2-i} = (Z_w)^{-1} \cdot \text{world } X_{w-i}(E_w)^{-1}$ (54).

Such joint variables $\phi_{1-i}, \phi_{2-i}, \ldots, \phi_{6-i}$ of workpiece handling robot 1 are transformed into actuating values $a_{w1-i}, a_{w2-i}, \ldots, a_{w6-i}$ for actuators thereof by use of following equations (102E) [ST114], which are outputted just after the lapse of time comes into $\Delta t_{-i}$ [ST115, ST116], and the procedure is returned to the second process.

$a_{w1-i} = \phi_{1-i}/R_{w1}$ (102E)
$a_{w2-i} = \phi_{2-i}/R_{w2}$
$a_{w3-i} = \phi_{3-i}/R_{w3}$
$a_{w4-i} = \phi_{4-i}/R_{w4}$
$a_{w5-i} = \phi_{5-i}/R_{w5}$
$a_{w6-i} = \phi_{6-i}/R_{w6}$ This equation (102E) is the same with equation (102) mentioned above.

In above-mentioned "co-acting cartesian coordinates manual operations", the world coordinates system is applied to the coordinates system in order to regulate movement of the axial directions of each axis or rotation around each axis in the cartesian coordinates relating to the position and attitude of workpiece handling robot 1. The coordinates system at the base point 52 of the workpiece handling robot 1 as shown in FIG. 5 may be applied to the coordinates system related to the present invention instead of the world coordinates system.

In such case, equations (6), (7), (8), (9) and (10) in the first process are replaced with following ones.

A homogeneous transformation matrix "$_{w1}X_{w-o}$" of the position and attitude of the referential point 56 of workpiece with respect to the base point 52 of workpiece handling robot 1 is as follows;

$_{w1}X_{w-o} = W_{2-0} \cdot E_w$ (6X)

where a matrix $W_{2-0}$ is given by equation (3), and $E_w$ is a homogeneous transformation matrix of position and attitude of the referential point 56 of workpiece with respect to the holding point 53 of workpiece $1m$. The data of this $E_w$ is previously stored, as an example mentioned above, in the "control means for manual teaching operations" 4A.

A homogeneous transformation matrix "$_{T1}X_{t-o}$" of position and attitude of the tip point 57 of tool $2n$ with respect to the base point 54 of tool handling robot 2 is as follows;

$_{T1}X_{t-o} = T_{2-0} \cdot E_t$ (7X)

where a matrix $T_{2-0}$ is given by equation (5), and $E_t$ a homogeneous transformation matrix of the position and attitude of the tip point 57 of tool with respect to the installation point 55 of tool $2n$. The data of this $E_t$ is also previously stored, as an example mentioned above, in the "control means for manual teaching operations" 4A.

A following equation (8X) is formulated by use of a homogeneous transformation matrix $Z_w$ of the position and attitude of the base point 52 of workpiece handling robot 1 with respect to the world coordinates system as shown in FIG. 5, a homogeneous transformation matrix $Z_t$ of the position and attitude of the base point 54 of tool handling robot 2 with respect to the world coordinates system, and a homogeneous transformation matrix $wX_t$ of the position and attitude of the tip point 57 of tool $2n$ with respect to the referential point 56 of the workpiece.

$$Z_t \tau_1 X_{t-o} = Z_w \cdot w_1 X_{w-o} \cdot wX_t \tag{8X}$$

Therefore, $wX_t$ is calculated from a following equation.

$$wX_t = (w_1 X_{w-o})^{-1} \cdot Z_w^{-1} \cdot Z_t \tau_1 X_{t-o} \tag{9X}$$

A homogeneous transformation matrix $w_1 X_{w-o}$ of the position and attitude of the referential point 56 of workpiece with respect to the base point 52 of workpiece handling robot 1 is as follows;

$$w_1 X_{w-o} = \begin{bmatrix} n_x & o_x & a_x & p_x \\ n_y & o_y & a_y & p_y \\ n_z & o_z & a_z & p_z \\ 0 & 0 & 0 & 1 \end{bmatrix} \tag{10X}$$

And equations (16), (17), (18), (19), (20), (21) and (22) in the third process are replaced with following ones.

A homogeneous transformation matrix $w_1 X_{w-i}$ of position and attitude of the referential point 56 of workpiece with respect to the base point 52 of workpiece handling robot 1 is calculated from equation (16X).

$$w_1 X_{w-i} = \text{Trans}(X_{w-i}, Y_{w-i}, Z_{w-i}) \cdot \text{Rot}(Z, \alpha_{w-i}) \cdot \text{Rot}(Y, \beta_{w-i}) \cdot \text{Rot}(Z, \gamma_{w-i}) \tag{16X}$$

Even if workpiece $1m$ acts according to equation (16X), position and attitude $T_{2-i}$, which the relative position and attitude of tool $2n$ against workpiece $1m$ are never changed, of tool handling robot 2 can be calculated as follows.

A following equation (18X) is formulated as the above-mentioned equation (8X).

$$Z_t \tau_1 X_{t-i} = Z_w \cdot w_1 X_{w-i} \cdot wX_t \tag{17X}$$

A following equation is formulated from the relation of the coordinates as the above-mentioned equation (7X).

$$\tau_1 X_{t-i} = T_{2-o} \cdot E_t \tag{18X}$$

From equation (18X), a following equation (19X) is formulated.

$$T_{2-i} = \tau_1 X_{t-i} (E_t)^{-1} \tag{19X}$$

Substituting equation (17X) into equation (19X) results the equation (20X).

$$T_{2-i} = (Z_t)^{-1} \cdot Z_w \cdot w_1 X_{w-i} \cdot wX_t (E_t)^{-1} \tag{20X}$$

On the other hand, equation (21X) is formulated as an above-mentioned equation (6X), $$w_1 X_{w-i} = W_{2-i} \cdot E_w \tag{21X}$$

and a homogeneous transformation matrix $W_{2-i}$ of the position and attitude of workpiece handling robot 1 can be calculated by equation (22X).

$$W_{2-i} = w_1 X_{w-i} (E_w)^{-1} \tag{22X}$$

In the teaching operations by use of "co-acting manual operation", as described above, "actuating values for actuators" of the workpiece handling robot and "actuating values for actuators" of the tool handling robot are computed by means of estimating a state after a previously fixed constant infinitesmal time. When the lapse of time comes into a predetermined time, "actuating values for actuators" of the tool handling robot and "actuating values for actuators" of the workpiece handling robot are synchronously outputted, therefore, the joints of the workpiece handling robot and joints of the tool handling robot are actuated according to the output signals respectively.

As the co-action which associates the workpiece with the tool while pressing the keys is synchronously achieved, the relative position and attitude of the tool against the workpiece is always constant, which is a specific effect of the present invention. In addition, the relative position and attitude of the tool against the workpiece is stopped maintaining previous ones after releasing the keys.

When the keys are released, the robots are really stopped after the above-mentioned infinitesimal time, but the movement of the workpiece and tool are not influenced if a preferably rate is selected in the rate changing switch. And the workpiece and the tool are acculately stopped at a desired position by means of movement till the vicinity of a target in a high speed and movement close to the target in a lower speed.

The rapid and simplified teaching operations are established owing to unnecessity of retiring the tool from the workpiece in order to avoid interference of the tool with the workpiece. Even if the position and attitude of the workpiece are changed, relative position and attitude of the tool against the workpiece are never changed. Therefore, it becomes easy to find the position and attitude of the tool against the workpiece at the last teaching point, enabling a correct teaching at a next desired point.

What is claimed is:

1. A teaching control device for manual operations of an industrial robotic system, the robotic system including a workpiece handling robot for manipulating a position and an attitude of a workpiece and a tool handling robot for manipulating a position and an attitude of a tool processing said workpiece, said teaching control device comprising:

(a) selecting means of sole-action/co-action for supplying a mode signal for selecting
      (i) a sole-acting manual mode of operation of said robotic system wherein manipulation of the position and the attitude of the workpiece by said workpiece handling robot are performed independently of the manipulation of the position and the attitude of the tool by said tool handling robot, and
      (ii) a co-acting manual mode of operation wherein the manipulation of the position and the attitude of the tool by said tool handling robot are coordinated with and interdependent on the manipulation of the position and the attitude of the workpiece by said workpiece handling robot so that a relative position and a relative attitude of the tool against the workpiece are maintained substantially constant;

(b) selecting means of a handling robot for supplying a robot signal to select one of the workpiece handling robot and the tool handling robot;

(c) teaching key means for supplying actuating signals for changing the position and the attitude of said workpiece or said tool;

(d) control means for co-acting teaching operations and controlling said robotic system in response to said actuating signals, said robot signal selecting said workpiece handling robot and said mode signal, said control means comprising a computer for performing the following steps;

(i) receiving said actuating signals, computing a previous position and a previous attitude of the workpiece in a preset coordinate system before receiving said actuating signals in response to previous joint variables of said workpiece handling robot and computing a previous relative position and a previous relative attitude of the tool against the workpiece before receiving said actuating signals in response to previous joint variables of said workpiece handling robot and previous joint variables of said tool handling robot;

(ii) controlling an execution of a calculating step in response to said actuating signals maintained for a preset time interval, controlling a repetition of said computing step in response to detecting a change in said actuating signals in the middle of said preset time interval or controlling a termination of said co-acting manual mode of operation in response to an absence of said actuating signals in the middle of said preset time interval;

(iii) calculating the position and the attitude of said workpiece after a preset time interval in response to said actuating signals and said previous position and said previous attitude of the workpiece in the preset coordinate system before receiving said actuating signals calculated by said computing step and calculating the position and the attitude of the tool after a preset time interval in response to said previous relative position and said previous relative attitude of the tool against the workpiece before receiving the actuating signals calculated by said computing step and said position and said attitude of the workpiece after a preset time interval;

(iv) calculating joint variables of the workpiece handling robot after a preset time interval in response to the position and the attitude of the workpiece after a preset time interval calculated by said calculating step and calculating joint variables of the tool handling robot after a preset time interval in response to a position and an attitude of the tool after a preset time interval calculated by said calculating step; and (v) calculating actuating values for the actuators of the workpiece handling robot in response to said joint variables of the workpiece handling robot after a preset time interval and calculating the actuating values for the actuators of the tool handling robot in response to said joint variables of the tool handling robot after a preset time interval, and in response, simultaneously supplying control signals of the actuating values to the actuators of the workpiece handling robot and control signals of the actuating values to actuators of the tool handling robot, and further commanding a repetition of said controlling step.

2. A teaching control device for manual operations according to claim 1, wherein:
   said actuating signals include signals commanding for linear motion of a workpiece along each axis and for revolution of a workpiece around each axis of the cartesian coordinates.

3. A teaching control device for manual operations according to claim 1, wherein:
   said actuating signals include signals commanding for rotation of the joints of said workpiece handling robot.

* * * * *